ns011838931B2

(12) United States Patent
Pezeshki et al.

(10) Patent No.: US 11,838,931 B2
(45) Date of Patent: Dec. 5, 2023

(54) FEEDBACK OF REMAINING DELAY BUDGET

(71) Applicant: QUALCOMM Incorporated, San Diego, CA (US)

(72) Inventors: Hamed Pezeshki, San Diego, CA (US); Tao Luo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 17/037,621

(22) Filed: Sep. 29, 2020

(65) Prior Publication Data

US 2021/0105762 A1    Apr. 8, 2021

Related U.S. Application Data

(60) Provisional application No. 62/910,309, filed on Oct. 3, 2019.

(51) Int. Cl.
*H04W 72/51*     (2023.01)
*H04W 72/0446*   (2023.01)
*H04W 72/21*     (2023.01)

(52) U.S. Cl.
CPC ....... *H04W 72/51* (2023.01); *H04W 72/0446* (2013.01); *H04W 72/21* (2023.01)

(58) Field of Classification Search
CPC ........... H04W 72/048; H04W 72/0413; H04W 72/0446; H04W 72/1205; H04W 28/0268; H04W 28/0236; H04W 16/14; H04W 72/042; H04W 72/1289
See application file for complete search history.

(56) References Cited

U.S. PATENT DOCUMENTS

| 8,699,487 | B2 * | 4/2014 | Damnjanovic | H04W 28/06 455/450 |
| 9,923,836 | B1 | 3/2018 | Vivanco | |
| 10,904,907 | B2 * | 1/2021 | Prakash | H04W 28/0268 |
| 10,986,528 | B2 * | 4/2021 | Dao | H04L 12/1407 |
| 11,159,436 | B2 * | 10/2021 | Yavuz | H04W 28/12 |
| 11,595,845 | B2 * | 2/2023 | Dao | H04M 15/8016 |

(Continued)

OTHER PUBLICATIONS

International Search Report and Written Opinion—PCT/US2020/053546—ISA/EPO—dated Jan. 15, 2021.

*Primary Examiner* — Brian T O Connor
(74) *Attorney, Agent, or Firm* — Holland & Hart LLP

(57) ABSTRACT

Methods, systems, and devices for wireless communications are described. A base station may transmit a data packet to a user equipment (UE). The data packet may have an associated packet delay budget to maintain a quality of experience for a user of the UE. The UE may determine a packet delivery time associated with the packet based on a communications latency and a signal processing latency. The UE may assess the packet delay budget and determine a remaining delay budget based on the packet delivery time. The UE may report the remaining delay budget to the base station in a feedback message. Based on the feedback message, the base station may determine to adjust a transmission time for subsequent data packet transmissions to improve data packet transmission and processing reliability.

30 Claims, 20 Drawing Sheets

(56) References Cited

U.S. PATENT DOCUMENTS

| | | | |
|---|---|---|---|
| 11,647,415 B2* | 5/2023 | Eriksson | H04W 72/569 |
| | | | 370/329 |
| 11,700,628 B2* | 7/2023 | Sabella | H04L 41/0895 |
| | | | 370/331 |
| 2009/0196275 A1 | 8/2009 | Damnjanovic et al. | |
| 2019/0239097 A1 | 8/2019 | Meylan et al. | |
| 2020/0280871 A1* | 9/2020 | Khirallah | H04W 28/0257 |
| 2020/0367094 A1* | 11/2020 | Eriksson | H04W 72/1242 |

* cited by examiner

FEEDBACK OF REMAINING DELAY BUDGET

CROSS REFERENCE

The present application for patent claims the benefit of U.S. Provisional Patent Application No. 62/910,309 by PEZESHKI et al., entitled "FEEDBACK OF REMAINING DELAY BUDGET," filed Oct. 3, 2019, assigned to the assignee hereof, and expressly incorporated by reference herein.

FIELD OF TECHNOLOGY

The following relates generally to wireless communications and more specifically to feedback of remaining delay budget.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a base station using an enhanced mobile broadband (eMBB) protocol. However, for some use cases, conventional eMBB transmission techniques are deficient.

SUMMARY

The described techniques relate to improved methods, systems, devices, and apparatuses that support feedback of remaining delay budget. Generally, the described techniques provide for enabling a user equipment (UE) to provide feedback to a base station to improve packet transmission reliability. A base station may transmit a data packet to a UE, for example in a physical downlink shared channel (PDSCH) transmission. The data packet may be associated with an extended reality (XR) application, and may have an associated packet delay budget to maintain a quality of experience for a user of the UE. The UE may determine a packet delivery time associated with the packet based on a communications latency and a signal processing latency. The UE may assess the packet delay budget and determine a remaining delay budget (e.g., a delay budget margin) based on the packet delivery time. The UE may report the remaining delay budget to the base station in a feedback message, for example in an acknowledgment (ACK) message in a physical uplink control channel (PUCCH) transmission. Based on the feedback message, the base station may determine to adjust a transmission time for subsequent data packet transmissions to improve data packet transmission and processing reliability.

A method of wireless communications by a UE is described. The method may include receiving, from a base station, a data transmission that includes an application packet and transmitting a feedback message for the data transmission that includes an indicator of a remaining delay budget that is determined based on a processing time utilized for processing the application packet.

An apparatus for wireless communications by a UE is described. The apparatus may include a processor, memory coupled with the processor, and instructions stored in the memory. The instructions may be executable by the processor to cause the apparatus to receive, from a base station, a data transmission that includes an application packet and transmit a feedback message for the data transmission that includes an indicator of a remaining delay budget that is determined based on a processing time utilized for processing the application packet.

Another apparatus for wireless communications by a UE is described. The apparatus may include means for receiving, from a base station, a data transmission that includes an application packet and transmitting a feedback message for the data transmission that includes an indicator of a remaining delay budget that is determined based on a processing time utilized for processing the application packet.

A non-transitory computer-readable medium storing code for wireless communications by a UE is described. The code may include instructions executable by a processor to receive, from a base station, a data transmission that includes an application packet and transmit a feedback message for the data transmission that includes an indicator of a remaining delay budget that is determined based on a processing time utilized for processing the application packet.

Some examples of the method, apparatuses, and non-transitory computer-readable medium described herein may further include operations, features, means, or instructions for receiving a grant that allocates an earlier transmission time interval within a packet delay budget time interval for a second data transmission to the UE based on the indicator of the remaining delay budget.

Some examples of the method, apparatuses, and non-transitory computer-readable medium described herein may further include operations, features, means, or instructions for receiving the second data transmission that includes a second application packet based on the grant, and transmitting a second feedback message for the second data transmission that includes a second indicator of a second remaining delay budget that may be determined based on a second processing time utilized for processing the second application packet.

Some examples of the method, apparatuses, and non-transitory computer-readable medium described herein may further include operations, features, means, or instructions for receiving a grant that allocates a later transmission time interval within a packet delay budget time interval for a second data transmission to the UE based on the indicator of the remaining delay budget.

Some examples of the method, apparatuses, and non-transitory computer-readable medium described herein may further include operations, features, means, or instructions for receiving the second data transmission that includes a second application packet based on the grant, and transmitting a second feedback message for the second data transmission that includes a second indicator of a second remaining delay budget that may be determined based on a second processing time utilized for processing the second application packet.

Some examples of the method, apparatuses, and non-transitory computer-readable medium described herein may further include operations, features, means, or instructions for receiving first control signaling that indicates a first semi-persistent scheduling pattern that allocates a first transmission time interval within a first packet delay budget time interval for the data transmission to the UE, where the data transmission may be received within the first transmission time interval in accordance with the first semi-persistent scheduling pattern.

Some examples of the method, apparatuses, and non-transitory computer-readable medium described herein may further include operations, features, means, or instructions for receiving second control signaling that indicates a second semi-persistent scheduling pattern that allocates a second transmission time interval within a second packet delay budget time interval for a second data transmission to the UE based on the indicator of the remaining delay budget.

In some examples of the method, apparatuses, and non-transitory computer-readable medium described herein, the second transmission time interval occurs earlier within the second semi-persistent scheduling pattern than the first transmission time interval occurs within the first semi-persistent scheduling pattern.

In some examples of the method, apparatuses, and non-transitory computer-readable medium described herein, the second transmission time interval occurs later within the second semi-persistent scheduling pattern than the first transmission time interval occurs within the first semi-persistent scheduling pattern.

In some examples of the method, apparatuses, and non-transitory computer-readable medium described herein, transmitting the feedback message for the data transmission that may include operations, features, means, or instructions for transmitting the feedback message for the data transmission that includes the indicator that may be a function of a remaining delay budget determined for a set of packet delay budget windows.

In some examples of the method, apparatuses, and non-transitory computer-readable medium described herein, the function of the remaining delay budget may be a maximum remaining delay budget determined for the set of packet delay budget windows.

In some examples of the method, apparatuses, and non-transitory computer-readable medium described herein, the function of the remaining delay budget may be an average remaining delay budget determined for the set of packet delay budget windows.

In some examples of the method, apparatuses, and non-transitory computer-readable medium described herein, the function of the remaining delay budget indicates a first set of one or more remaining delay budgets for the set of packet delay budget windows that may be each longer than a second set of one or more remaining delay budgets for the set of packet delay budget windows.

Some examples of the method, apparatuses, and non-transitory computer-readable medium described herein may further include operations, features, means, or instructions for quantizing the remaining delay budget to determine a number of transmission time intervals, where the indicator indicates the number of transmission time intervals.

Some examples of the method, apparatuses, and non-transitory computer-readable medium described herein may further include operations, features, means, or instructions for quantizing the remaining delay budget to determine a quantized time value, where the indicator indicates the quantized time value.

In some examples of the method, apparatuses, and non-transitory computer-readable medium described herein, the application packet includes extended reality data.

A method of wireless communications by a base station is described. The method may include transmitting, to a UE, a data transmission that includes an application packet and receiving a feedback message for the data transmission that includes an indicator of a remaining delay budget that is determined based on a processing time utilized for processing the application packet.

An apparatus for wireless communications by a base station is described. The apparatus may include a processor, memory coupled with the processor, and instructions stored in the memory. The instructions may be executable by the processor to cause the apparatus to transmit, to a UE, a data transmission that includes an application packet and receive a feedback message for the data transmission that includes an indicator of a remaining delay budget that is determined based on a processing time utilized for processing the application packet.

Another apparatus for wireless communications by a base station is described. The apparatus may include means for transmitting, to a UE, a data transmission that includes an application packet and receiving a feedback message for the data transmission that includes an indicator of a remaining delay budget that is determined based on a processing time utilized for processing the application packet.

A non-transitory computer-readable medium storing code for wireless communications by a base station is described. The code may include instructions executable by a processor to transmit, to a UE, a data transmission that includes an application packet and receive a feedback message for the data transmission that includes an indicator of a remaining delay budget that is determined based on a processing time utilized for processing the application packet.

Some examples of the method, apparatuses, and non-transitory computer-readable medium described herein may further include operations, features, means, or instructions for transmitting a grant that allocates an earlier transmission time interval within a packet delay budget time interval for a second data transmission to the UE based on the indicator of the remaining delay budget.

Some examples of the method, apparatuses, and non-transitory computer-readable medium described herein may further include operations, features, means, or instructions for transmitting the second data transmission that includes a second application packet based on the grant, and receiving a second feedback message for the second data transmission that includes a second indicator of a second remaining delay budget that may be determined based on a second processing time utilized for processing the second application packet.

Some examples of the method, apparatuses, and non-transitory computer-readable medium described herein may further include operations, features, means, or instructions for transmitting a grant that allocates a later transmission time interval within a packet delay budget time interval for a second data transmission to the UE based on the indicator of the remaining delay budget.

Some examples of the method, apparatuses, and non-transitory computer-readable medium described herein may further include operations, features, means, or instructions for transmitting the second data transmission that includes a second application packet based on the grant, and receiving a second feedback message for the second data transmission that includes a second indicator of a second remaining delay budget that may be determined based on a second processing time utilized for processing the second application packet.

Some examples of the method, apparatuses, and non-transitory computer-readable medium described herein may further include operations, features, means, or instructions for transmitting first control signaling that indicates a first semi-persistent scheduling pattern that allocates a first transmission time interval within a first packet delay budget time interval for the data transmission to the UE, where the data transmission may be transmitted within the first transmission time interval in accordance with the first semi-persistent scheduling pattern.

Some examples of the method, apparatuses, and non-transitory computer-readable medium described herein may further include operations, features, means, or instructions for transmitting second control signaling that indicates a second semi-persistent scheduling pattern that allocates a second transmission time interval within a second packet delay budget time interval for a second data transmission to the UE based on the indicator of the remaining delay budget.

In some examples of the method, apparatuses, and non-transitory computer-readable medium described herein, the second transmission time interval occurs earlier within the second semi-persistent scheduling pattern than the first transmission time interval occurs within the first semi-persistent scheduling pattern.

In some examples of the method, apparatuses, and non-transitory computer-readable medium described herein, the second transmission time interval occurs later within the second semi-persistent scheduling pattern than the first transmission time interval occurs within the first semi-persistent scheduling pattern.

In some examples of the method, apparatuses, and non-transitory computer-readable medium described herein, receiving the feedback message for the data transmission that may include operations, features, means, or instructions for receiving the feedback message for the data transmission that includes the indicator that may be a function of a remaining delay budget determined for a set of packet delay budget windows.

In some examples of the method, apparatuses, and non-transitory computer-readable medium described herein, the function of the remaining delay budget may be a maximum remaining delay budget determined for the set of packet delay budget windows.

In some examples of the method, apparatuses, and non-transitory computer-readable medium described herein, the function of the remaining delay budget may be an average remaining delay budget determined for the set of packet delay budget windows.

In some examples of the method, apparatuses, and non-transitory computer-readable medium described herein, the function of the remaining delay budget indicates a first set of one or more remaining delay budgets for the set of packet delay budget windows that may be each longer than a second set of one or more remaining delay budgets for the set of packet delay budget windows.

Some examples of the method, apparatuses, and non-transitory computer-readable medium described herein may further include operations, features, means, or instructions for quantizing the remaining delay budget to determine a number of transmission time intervals, where the indicator indicates the number of transmission time intervals.

Some examples of the method, apparatuses, and non-transitory computer-readable medium described herein may further include operations, features, means, or instructions for quantizing the remaining delay budget to determine a quantized time value, where the indicator indicates the quantized time value. In some examples of the method, apparatuses, and non-transitory computer-readable medium described herein, the application packet includes extended reality data.

DETAILED DESCRIPTION

Figure 1:
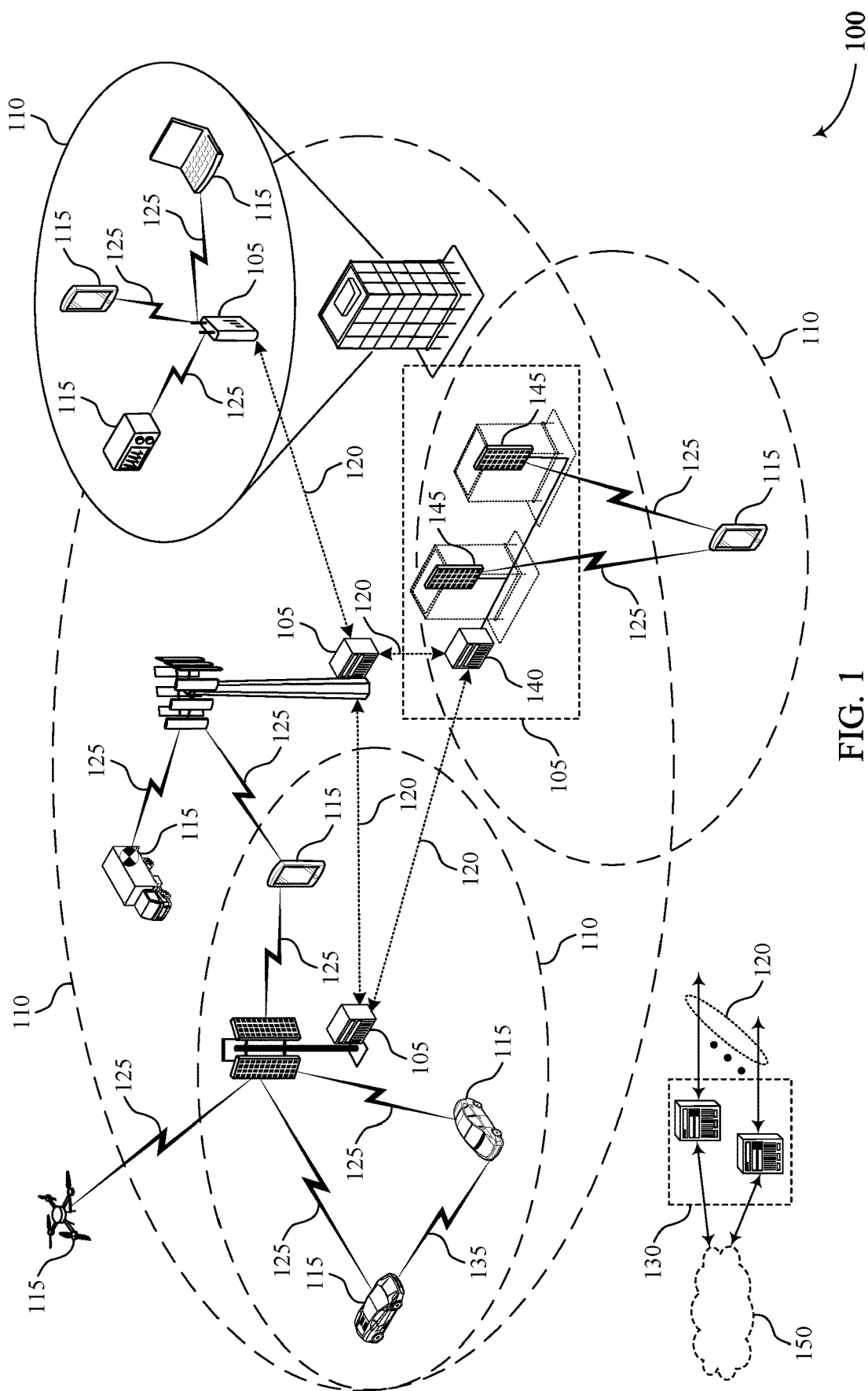
FIGS. 1 and 2 illustrate examples of a wireless communications system that supports feedback of remaining delay budget in accordance with aspects of the present disclosure.

Some wireless communication systems, such as fifth generation (5G) systems which may be referred to as New Radio (NR) systems, may include user equipment (UE) communicating with network nodes such as base stations, for example using an enhanced mobile broadband (eMBB) protocol. A base station may transmit a packet to a UE, where the packet may include data for the UE (e.g., audio data, video data, etc.). For example, the packet may be included in a physical downlink shared channel (PDSCH) transmission.

The packet may have an associated latency corresponding to a packet delivery time, or a duration between a time when the packet is transmitted and a time when the data in the packet is available to an application layer of the UE (i.e., when the packet is delivered). The associated latency may include a communications latency and a signal processing latency. The communications latency may correspond to a duration between a time when the packet is received at the UE and a time when the UE transmits an acknowledgment (ACK) or negative acknowledgment (NACK) message to the base station, for example in a physical uplink control channel (PUCCH) transmission. The signal processing latency may correspond to a duration in which the data in the packet is processed by the UE before the data is available to the application layer.

In some eMBB use cases, for example in extended reality (XR) applications, a packet may have an associated packet delay budget, which may correspond to a highest allowable latency associated with the packet. For example, in an XR application, the UE may have a configured amount of time (e.g., the packet delay budget) in which the UE is to receive, process, and present application data in the packet. The packet may have an associated expiry time, which may correspond to an end of the packet delay budget. If the UE is unable to present the application data before the packet expiry time, or if a margin between the latency and the packet delay budget is small (e.g., below a threshold), a user of the UE may have a degraded experience in the XR application (e.g., the application data may be dropped and/or not presented, the UE may delay presenting the data until the UE has finished processing the data, etc.). XR applications may use a higher data rate (e.g., for video traffic) than some other applications, and data packets may have a smaller packet delay budget, in order to maintain an expected experience for the user of the UE. These factors may make the effect of signal processing times at the UE more pronounced compared to other applications.

Different UEs may have different characteristics which may impact the respective signal processing latencies of the UEs. For example, a UE with a greater processing capability may process a packet in less time than a UE with a lower processing capability. Some UEs may have a statistically large margin between the packet delivery time and the packet delay budget, while some other UEs may have a statistically small margin between a packet delivery time and the packet delay budget. UEs that consistently have a small margin compared to other UEs may be more vulnerable to packet failure. For example, the packet delivery time may exceed the packet delay budget, and a UE may fail to process the packet before the packet expiry time.

A base station may be aware of the communications latency associated with a transmitted packet based on receiving an ACK message, but may be unaware of the signal processing latency associated with a given UE. Accordingly, techniques are described herein which may enable a UE to report feedback associated with a remaining delay budget. The remaining delay budget may indicate the margin between the packet delivery time and the packet delay budget. In some examples, the UE may include an indication of the remaining delay budget in the ACK message transmitted to the base station. In some examples, the UE may quantize the remaining delay budget when reporting the feedback. For example, the UE may report the remaining delay budget as a number of slots, a quantized time value, or another quantization of the remaining delay budget, or a combination thereof.

The base station may leverage feedback reports from UEs to improve the reliability of packet transmissions. For example, the base station may modify a scheduling of subsequent packet transmissions to favor UEs with lower delay budget margins over UEs with higher delay budget margins. For example, a base station may schedule packet transmissions to UEs with lower delay budget margins in earlier scheduling instances, to provide the UEs with additional time to receive and process corresponding packets.

Aspects of the disclosure are initially described in the context of wireless communications systems. Example transmission schemes, an example timing diagram, and an example process flow illustrating aspects of the discussed techniques are then described. Aspects of the disclosure are further illustrated by and described with reference to apparatus diagrams, system diagrams, and flowcharts that relate to feedback of remaining delay budget.

FIG. 1 illustrates an example of a wireless communications system 100 that supports feedback of remaining delay budget in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may transmit a data packet to a UE 115, for example in a PDSCH transmission. In an example, the data packet may be associated with an XR application, and may have a packet delay budget (e.g., 8 ms) to maintain a quality of experience for a user of the UE 115. The packet delay budget may correspond to the amount of time in which the UE 115 has to process a received packet and utilize the application data (e.g., process and present video application data to a user in a timely manner in an XR display) The UE 115 may determine a packet delivery time associated with the packet based on a communications latency and a signal processing latency. The UE 115 may assess the packet delay budget and determine a remaining delay budget (e.g., a delay budget margin) based on the packet delivery time. The UE 115 may report the remaining delay budget to the base station 105 in a feedback message, for example in an ACK message in a PUCCH transmission. Based on the feedback message, the base station 105 may determine to adjust a transmission time for subsequent data packet transmissions.

Figure 2:
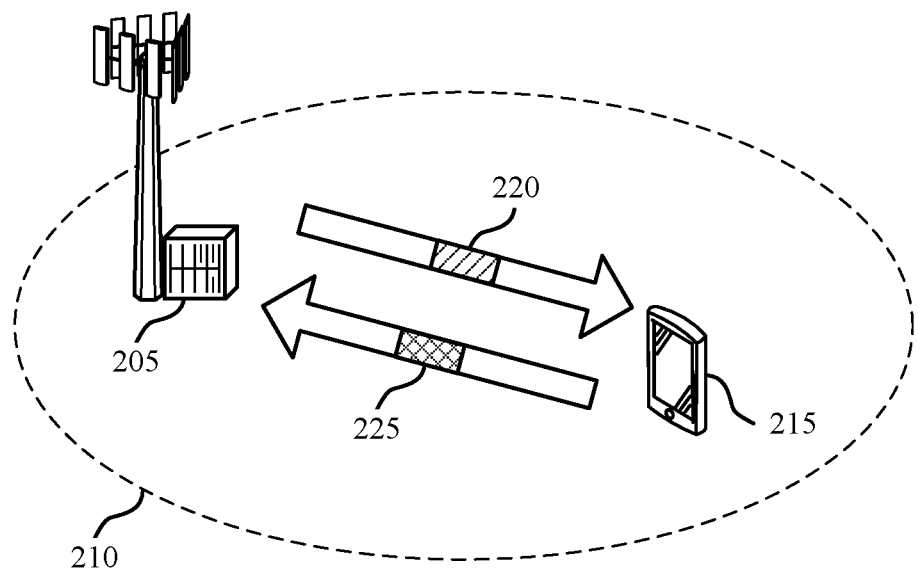
Figure 2:
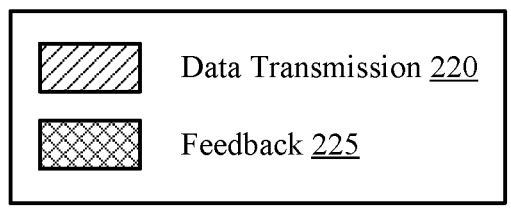

FIG. 2 illustrates an example of a wireless communications system 200 that supports feedback of remaining delay budget in accordance with aspects of the present disclosure. In some examples, wireless communications system 200 may implement aspects of wireless communication system 100. For example, the wireless communications system 200 may include a base station 205 and a UE 215, which may be examples of the corresponding devices described with reference to FIG. 1. The wireless communications system 200 may include features for improved UE packet processing operations, among other benefits.

In the wireless communications system 200, the base station 205 may provide a geographic coverage area 210. The base station 205 may configure and transmit a data transmission 220 to the UE 215. In some examples, the base station 205 may indicate a file arrival time to the UE 215, for example in a physical downlink control channel (PDCCH) scheduling the data transmission 220. The UE 215 may transmit feedback 225 to the base station 205 based on the data transmission 220. For example, the UE 215 may determine a processing time associated with the data transmission 220, where the processing time may correspond to a duration between the indicated file arrival time (e.g., packet arrival time) and a time when the data in the packet is available to an application layer of the UE 215. The UE 215 may compare the processing time to a packet delay budget associated with the data transmission 220 to determine a remaining delay budget. The UE 215 may indicate a delay budget margin based on the remaining delay budget to the base station 205 in the feedback 225.

Based on the feedback 225, the base station 205 may adjust a transmission time for data transmissions 220 intended for the UE 215. In one example, the base station 205 may determine the delay budget margin reported by the UE 215 in the feedback 225 is larger than other UEs (not shown) that are scheduled to receive data packets. The base station 205 may determine to increase a transmission time interval between the file arrival time and a time when the data transmission 220 for the UE 215 is transmitted. By increasing the transmission time interval, the base station 205 may transmit packets to other UEs (e.g., UEs with smaller delay budget margins) closer to the file arrival time, which may provide the other UEs with additional time to receive the data packets. In another example, the base station 205 may determine the delay budget margin reported by the UE 215 is smaller than other UEs, and determine to decrease the transmission time interval accordingly.

Figure 3:
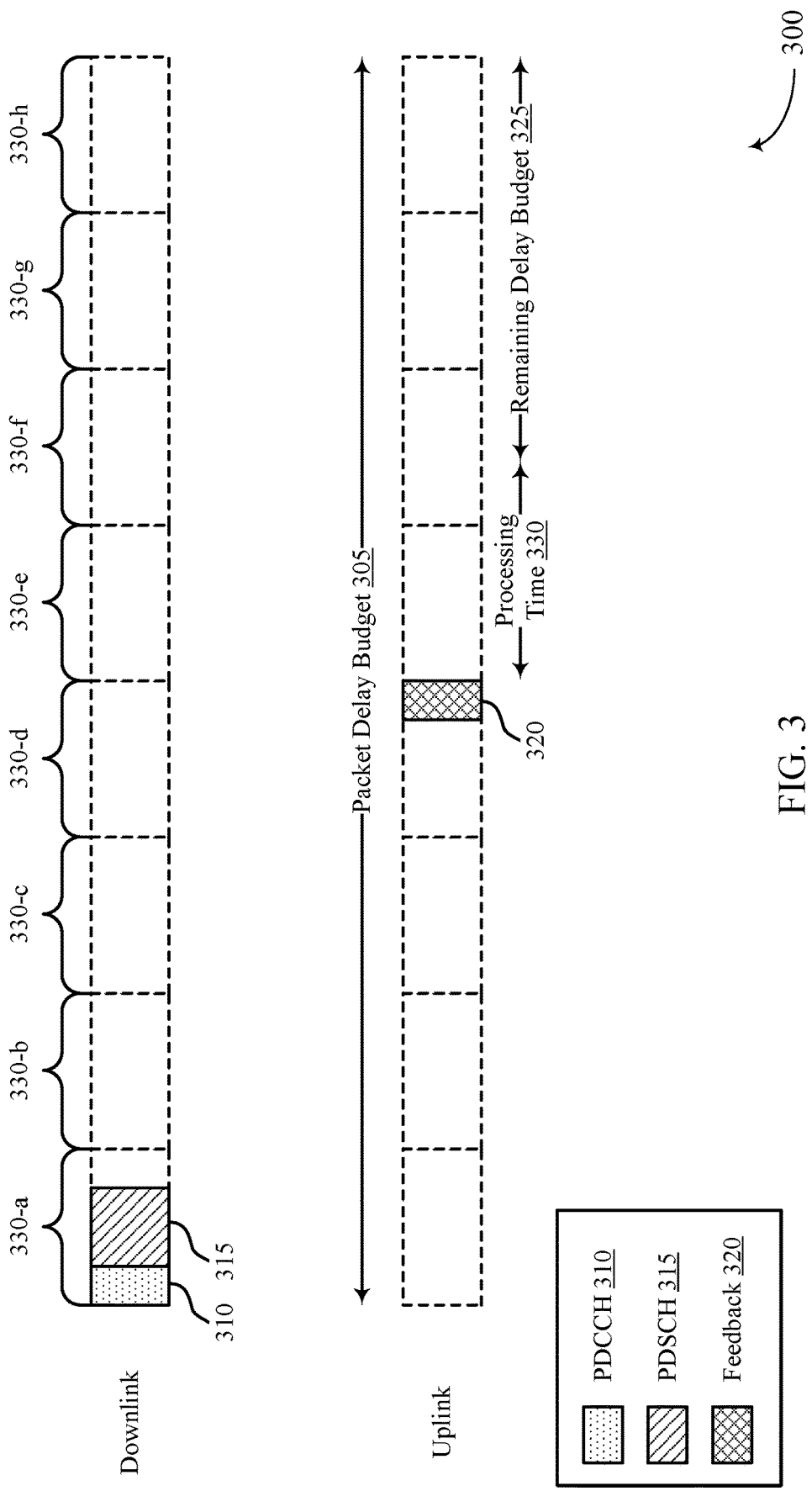
FIG. 3 illustrates an example of a transmission scheme that supports feedback of remaining delay budget in accordance with aspects of the present disclosure.

FIG. 3 illustrates an example of a transmission scheme 300 that supports feedback of remaining delay budget in accordance with aspects of the present disclosure. In some examples, the transmission scheme 300 may implement aspects of wireless communication systems 100 and 200. The transmission scheme 300 may be associated with communications between a UE and a base station, which may be examples of corresponding devices described with reference to FIGS. 1 and 2. The transmission scheme 300 may allow a UE to improve packet processing reliability by reporting feedback related to a packet delay budget.

A base station may schedule a data packet to transmit to a UE. The base station may determine a packet delay budget 305 associated with the data packet based on a use case associated with the data packet. For example, the data packet may include data for an XR application at the UE. The base station may indicate the configuration of the data packet in a PDCCH transmission 310 to the UE. For example, the PDCCH transmission 310 may schedule a PDSCH transmission 315, which may include the data packet. The PDCCH transmission 310 may also indicate the packet delay budget 305 is associated with slots 330-a through 330-h. Based on receiving the PDCCH transmission 310, the UE may determine a packet delay budget 305 that begins with a file arrival time associated with receiving the data packet at the beginning of the slot 330-a, and the packet delay budget 305 ends at a packet expiry time associated with the data packet at the end of the slot 330-h.

The base station may include the data packet in the PDSCH transmission 315. The UE may assess the packet delay budget 305 through an application layer of the UE. The UE may determine a remaining delay budget 325 based on a processing time 330 associated with the data packet in the PDSCH transmission 315. The remaining delay budget 325 may be the amount of time remaining within the packet delay budget 305 after the UE 115 is able to complete processing of a received packet and the packet is output to the application layer of the UE 115. The UE may report the remaining delay budget 325 to the base station, for example as a delay budget margin in a feedback message 320. In some examples, the feedback message 320 may include an ACK message, or may be included in a PUCCH transmission. In some examples, the UE may quantize the remaining delay budget 325 in the delay budget margin included in the feedback message 320. For example, the UE may report the remaining delay budget 325 in terms of a quantity of transmission time intervals (e.g., slots), a quantized time value, or another quantization of the remaining delay budget 325, or a combination thereof. In some examples, the processing time 330 may not be transparent to the base station (e.g., some UEs may have faster signal processing compared to other UEs), and for some applications, such as XR, the processing time 330 may not be negligible. A total of a communications latency (e.g., a duration between an arrival of the data packet and the feedback message 320) and the processing time 330 (which may be different for different UEs) should not exceed the packet delay budget 305.

In some examples, the UE may report the remaining delay budget 325 in a short-term manner, which may include reporting the remaining delay budget 325 in each feedback message 320. Additionally or alternatively, the UE may report the remaining delay budget 325 in a long-term manner based on determining a remaining packet delay budget over a set of data transmissions. For example, the UE may report one or more statistics associated with the remaining delay budget 325 in the feedback message 320 in a PUCCH transmission. The one or more statistics may include, for the set of received data transmissions, a highest remaining delay budget 325 from the set, or an average (or any other statistical metric of the remaining delay budget 325 for the set), or a number of largest values from the set for the remaining delay budget 325 (e.g., top N values for the remaining delay budget 325), or any combination thereof. The remaining delay budget 325 reported in the feedback message 320 may enable the base station to improve the reliability of packet transmissions by increasing the likelihood that the UE will successfully receive the packet transmissions.

Figure 4:
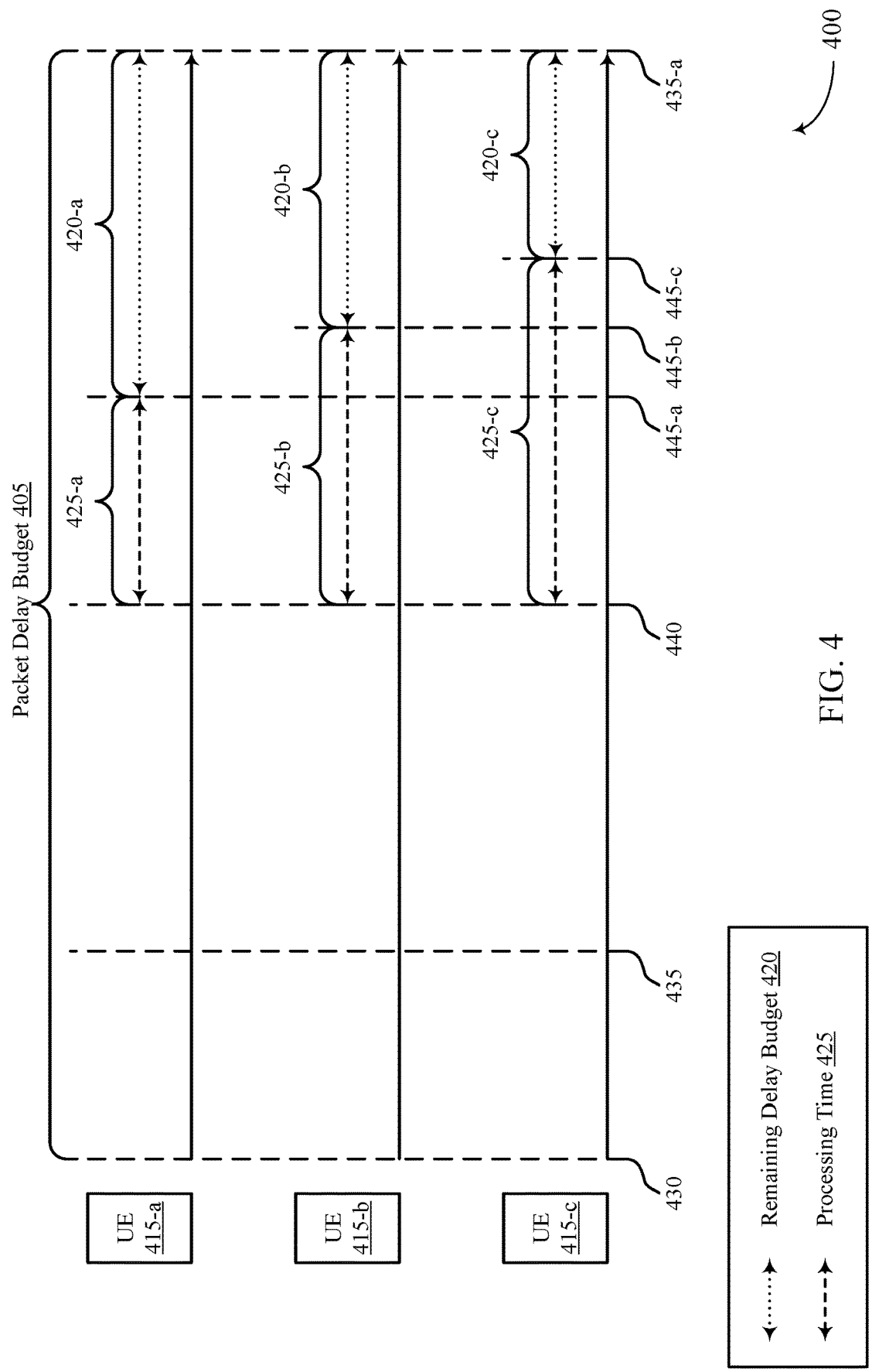
FIG. 4 illustrates an example of a timing diagram that supports feedback of remaining delay budget in accordance with aspects of the present disclosure.

FIG. 4 illustrates an example of a timing diagram 400 that supports feedback of remaining delay budget in accordance with aspects of the present disclosure. In some examples, timing diagram 400 may implement aspects of wireless communication systems 100 and 200. The timing diagram 400 may be associated with communications between UEs 415 and a base station, which may be examples of corresponding devices described with reference to FIGS. 1 and 2.

The timing diagram 400 illustrates a timing for receiving and processing a packet at a UE 415-a, a UE 415-b, and a UE 415-c. The UEs 415 may identify a packet delay budget 405 associated with the packet, which may indicate an overall latency associated with the packet. The UE 415-a may have a greater processing capability than the UE 415-b and the UE 415-c, and the UE 415-b may have a greater processing capability than the UE 415-c. As illustrated in FIG. 4, each of the UEs 415 may identify a same packet arrival time 430, for example based on an indication in a PDCCH transmission. Each UE 415 may be scheduled to receive a packet at a scheduling time 435, and each UE 415 may transmit feedback (e.g., an ACK message) at a feedback time 440. In some cases, the feedback time 440 may be a time at which the packet is decoded and a UE 415 starts processing data of the packet. In some other cases, the feedback time 440 may be a time instance when the UE 415 transmits the feedback (e.g., ACK or NACK). A communications latency associated with the packet may correspond to a duration between the packet arrival time 430 and the feedback time 440. The communications latency may additionally be based on the scheduling time 435.

Each UE 415 may determine a processing time 425 associated with processing the received packet to make the data available to an application layer of the UE 415. Based on the relative processing capabilities of the UEs 415, the processing time 425-a for the UE 415-a may be less than the processing time 425-b for the UE 415-b and the processing time 425-c for the UE 415-c. Additionally, the processing time 425-b for the UE 415-b may be less than the processing time 425-c for the UE 415-c.

Each UE 415 may have an associated communications latency deadline 445, which may be based on the respective processing time 425. For example, in order to process the packet successfully within the packet delay budget 405, the UE 415-a may have a communications latency that is less than a duration between the packet arrival time 430 and the deadline 445-a. The UEs 415-b and 415-c may also have respective deadlines 445-b and 445-c, for example based on the respective processing times 425-b and 425-c. In some examples, for a given UE 415, the scheduling time 435, the feedback time 440, and the deadline 445 may differ for different packets over time.

Each UE 415 may determine a remaining delay budget 420 based on the respective processing time 425. By assuming the same packet arrival time 430, the same scheduling time 435, and the same feedback time 440 for each UE 415, FIG. 4 illustrates the benefit of enabling each UE 415 to report the respective remaining delay budget 420. The UEs 415 may report the respective remaining delay budgets 420 to the base station in the feedback transmitted at the feedback time 440. Based on the reported feedback, the base station may determine to adjust the respective scheduling time 435 for each UE 415. For example, the base station may determine to adjust the scheduling time 435 for the UE 415-a to a later time, and to adjust the scheduling time 435 for the UE 415-c to an earlier time. By adjusting the scheduling time 435, the base station may improve the overall reliability of packet transmissions by increasing the likelihood that each UE 415 will successfully receive the packet transmissions within the packet delay budget 405.

In an example, a UE 415 (e.g., UE 415-a, 415-b, or 415-c) may report an "actual" remaining delay budget 420, for example, a remaining delay budget 420 based on one or more previous communication rounds. In other words, the UE 415 may look at a previous packet and may record when the processed packet was sent to a relevant application, and what the remaining packet delay budget 420 was when the processed packet was sent. In a next communication round the UE 415 may send this value (or a statistical metric of this value if the UE 415 records this value over multiple communication rounds) to report the actual remaining delay budget 420. For example, each packet may have a timer which counts down as time passes. When the counter reaches zero, the packet may expire. The UE 415 may capture the timer value when the packet is sent to the application layer and report the timer value in the feedback time 440 for a next packet. A UE 415 which has better processing capabilities (e.g., a UE 415 that may process a packet faster than another UE 415) may have larger timer values compared to those with poor processing capabilities.

In some examples, a reference point (e.g., start point) for a remaining packet delay budget 420 may be a time instance when the packet is decoded. In some other examples, the reference point for a remaining packet delay budget 420 may be a time that a UE 415 transmits the feedback (e.g., ACK or NACK) at the feedback time 440 (e.g., due to a delay between a time that the packet is decoded and the time that the UE 415 transmits the feedback).

Figure 5:
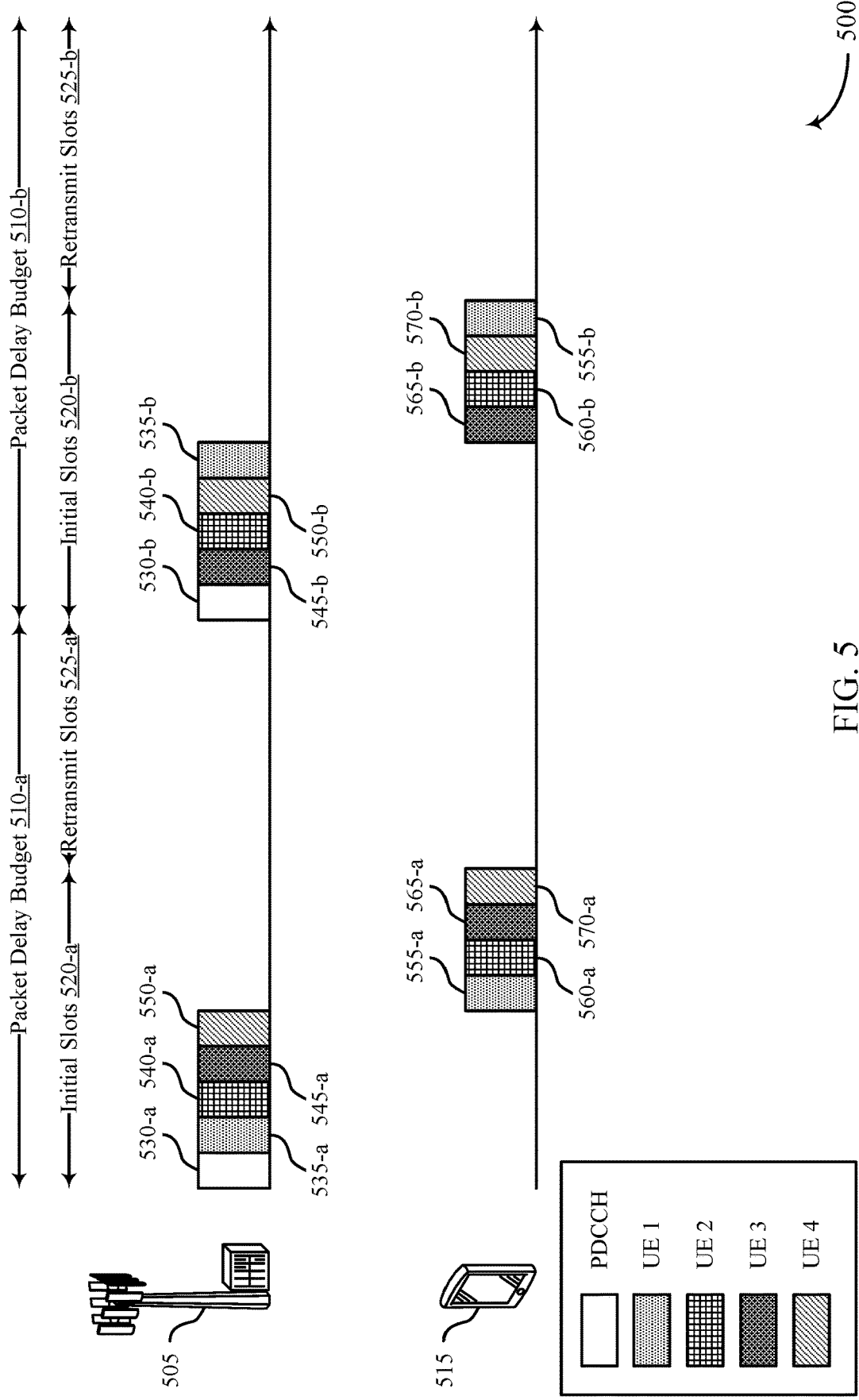
FIG. 5 illustrates an example of a transmission scheme that supports feedback of remaining delay budget in accordance with aspects of the present disclosure.

FIG. 5 illustrates an example of a transmission scheme 500 that supports feedback of remaining delay budget in accordance with aspects of the present disclosure. In some examples, the transmission scheme 500 may implement aspects of wireless communication systems 100 and 200. The transmission scheme 500 may be associated with communications between UEs 515 and a base station 505, which may be examples of corresponding devices described with reference to FIGS. 1 and 2. The transmission scheme 500 may allow a base station to improve packet processing reliability by leveraging feedback related to a packet delay budget.

The transmission scheme 500 illustrates data packet transmissions from a base station 505 and feedback transmission from UEs 515. The UEs 515 may be referred to as UE 1, UE 2, UE 3, and UE 4. The base station 505 may schedule data packets to transmit to the UEs 515. The base station 505 may determine a packet delay budget 510-a associated with the data packet based on a use case associated with the data packets. For example, the data packets may include data for XR applications at the UEs 515. The packet delay budget 510-a may include a quantity of slots 520-a for initial transmission of the data packets, as well as a quantity of slots 525-a for potential retransmissions of the data packets.

The base station 505 may indicate the scheduling of the data packets in a PDCCH transmission 530-a to the UEs 515. For example, the PDCCH transmission 530-a may indicate a scheduling time for a PDSCH transmission 535-a for the UE 1 of the UEs 515, followed by a PDSCH transmission 540-a for the UE 2, a PDSCH transmission 545-a for the UE 3, and a PDSCH transmission 550-a for the UE 4. The PDCCH transmission 530-a may also indicate the packet delay budget 510-a, including the slots 520-a and the slots 525-a. Based on receiving the PDCCH transmission 530-*a*, the UEs 515 may determine a file arrival time associated with the data packets corresponds to the beginning of the packet delay budget 510-*a*, and a packet expiry time associated with the data packet may correspond to the end of the packet delay budget 510-*a*.

In some examples, the base station 505 may schedule the PDSCH transmissions to the UEs 515 based on a semi-persistent scheduling (SPS) pattern. Based on the SPS pattern, the UEs 515 may monitor for PDSCH transmissions at regular intervals. The PDSCH transmissions in the SPS pattern may be staggered in time, where the staggering may be indicated in the grant scheduling the SPS pattern. Each UE 515 may identify a respective time relative to the file arrival time (i.e., the beginning of the packet delay budget 510) in which the UE 515 is to monitor for the respective PDSCH transmissions. The UE 1 may monitor for PDSCH transmissions 535 at a first time relative to the file arrival time, the UE 2 may monitor for PDSCH transmissions 540 at a second time relative to the file arrival time, the UE 3 may monitor for PDSCH transmissions 545 at a third time relative to the file arrival time, and the UE 4 may monitor for PDSCH transmissions 550 at a fourth time relative to the file arrival time.

The base station 505 may include the data packets in the PDSCH transmissions 535-*a*, 540-*a*, 545-*a*, and 550-*a*. Each UE 515 may determine a respective remaining delay budget based on a respective processing time associated with the data packet in the respective PDSCH transmission. Each UE 515 may report the respective remaining delay budget to the base station 505, for example as a delay budget margin in a feedback message. Each UE may include the feedback message in a PUCCH transmission. For example, the UE 1, the UE 2, the UE 3, and the UE 4 may include a feedback message in PUCCH transmissions 555-*a*, 560-*a*, 565-*a*, and 570-*a*, respectively.

In some examples, such as when the UEs 515 receive the PDSCH transmissions 535, 540, 545, and 550 based on the SPS pattern, the UEs 515 may, over time, report one or more statistics associated with the remaining delay budget in feedback messages in the PUCCH transmission. For example, the one or more statistics reported by the UE 1 may include, for the PDSCH transmissions 535, a highest remaining delay budget from the PDSCH transmissions 535, or an average (or any other statistical metric of the) remaining delay budget for the PDSCH transmissions 535, or a number of largest values from the PDSCH transmissions 535 for the remaining delay budget (e.g., top N values for the remaining delay budget), or any combination thereof.

Based on the reported feedback, the base station 505 may determine to adjust the scheduling times for the UEs 515 in a subsequent data packet transmission. As illustrated in FIG. 5, the base station 505 may determine to adjust the scheduling time for the UE 3 to an earlier time, and determine to adjust the scheduling time for the UE 4 to a later time. The base station 505 may indicate the configuration of the data packets in a PDCCH transmission 530-*b* to the UE. The configuration may include a packet delay budget 510-*b* associated with the data packet transmission. The packet delay budget 510-*b* may include a quantity of slots 520-*b* for initial transmission of the data packets, as well as a quantity of slots 525-*b* for potential retransmissions of the data packets. The configuration may also indicate the adjusted scheduling times to the UEs 515. For example, the PDCCH transmission 530-*b* may indicate a scheduling time for a PDSCH transmission 545-*b* for the UE 3 of the UEs 515, followed by a PDSCH transmission 540-*b* for the UE 2, a PDSCH transmission 550-*b* for the UE 4, and a PDSCH transmission 535-*b* for the UE 1.

In some examples, based on the reported statistics in the PUCCH transmissions 555-*a*, 560-*a*, 565-*a*, and 570-*a*, the base station 505 may identify a first subset of UEs 515 which consistently have lower remaining delay budgets, and determine to shuffle the SPS pattern such that the first subset of UEs 515 receive respective PDSCH transmissions closer to the file arrival time in order to improve the packet processing reliability for the first subset of UEs 115 (e.g., so that the first subset of UEs have more time to receive and process received signals to output received packets to the application layer in a timely manner). For example, the base station 505 may identify that the UE 3 consistently has a lower remaining delay budget than the UE 1, the UE 2, and the UE 4. The base station 505 may determine to shuffle the PDSCH transmission 545-*b* (and subsequent PDSCH transmission 545) closer to the file arrival time (e.g., to the first time relative to the file arrival time) at the beginning of the packet delay budget 510-*b*. Additionally, the base station 505 may identify a second subset of UEs 515 which consistently have higher remaining delay budgets, and determine to shuffle the SPS pattern such that the second subset of UEs 515 receive respective PDSCH transmissions later in time relative to the file arrival time in order to enable the base station 505 to schedule UEs 515 from the first subset in scheduling times earlier in time and hence closer to the packet arrival time. For example, the base station may identify that the UE 1 consistently has a higher remaining delay budget than the UE 2, the UE 3, and the UE 4. The base station may determine to shuffle the PDSCH transmission 535-*b* (and subsequent PDSCH transmission 535) further from the file arrival time (e.g., to the fourth time relative to the file arrival time) and shuffle the PDSCH transmission 550-*b* for the UE 4 closer to the file arrival time (e.g., to the third time relative to the file arrival time). Based on reordering the PDSCH transmissions 535, 540, 545, and 550, the base station 505 may improve the overall packet processing reliability for the UEs 515 (i.e., the UE 1, the UE 2, the UE 3, and the UE4) by improving the likelihood that the UEs 515 will receive, process, and present data in the PDSCH transmissions 535, 540, 545, and 550 before the packet expiry time at the end of the packet delay budget 510.

The base station 505 may include the data packets in the PDSCH transmissions 545-*b*, 540-*b*, 550-*b*, and 535-*b*. Each UE 515 may determine an updated respective remaining delay budget based on a respective processing time associated with the data packet in the respective PDSCH transmission. Each UE 515 may report the updated respective remaining delay budget to the base station 505, for example as an updated delay budget margin in a feedback message. Each UE may include the feedback message in a PUCCH transmission. For example, the UE 3, the UE 2, the UE 4, and the UE 1 may include a feedback message in PUCCH transmissions 565-*b*, 560-*b*, 570-*b*, and 555-*b*, respectively. Based on the reported feedback, the base station 505 may continue to adjust the scheduling times for the UEs 515 to improve packet processing reliability.

Figure 6:
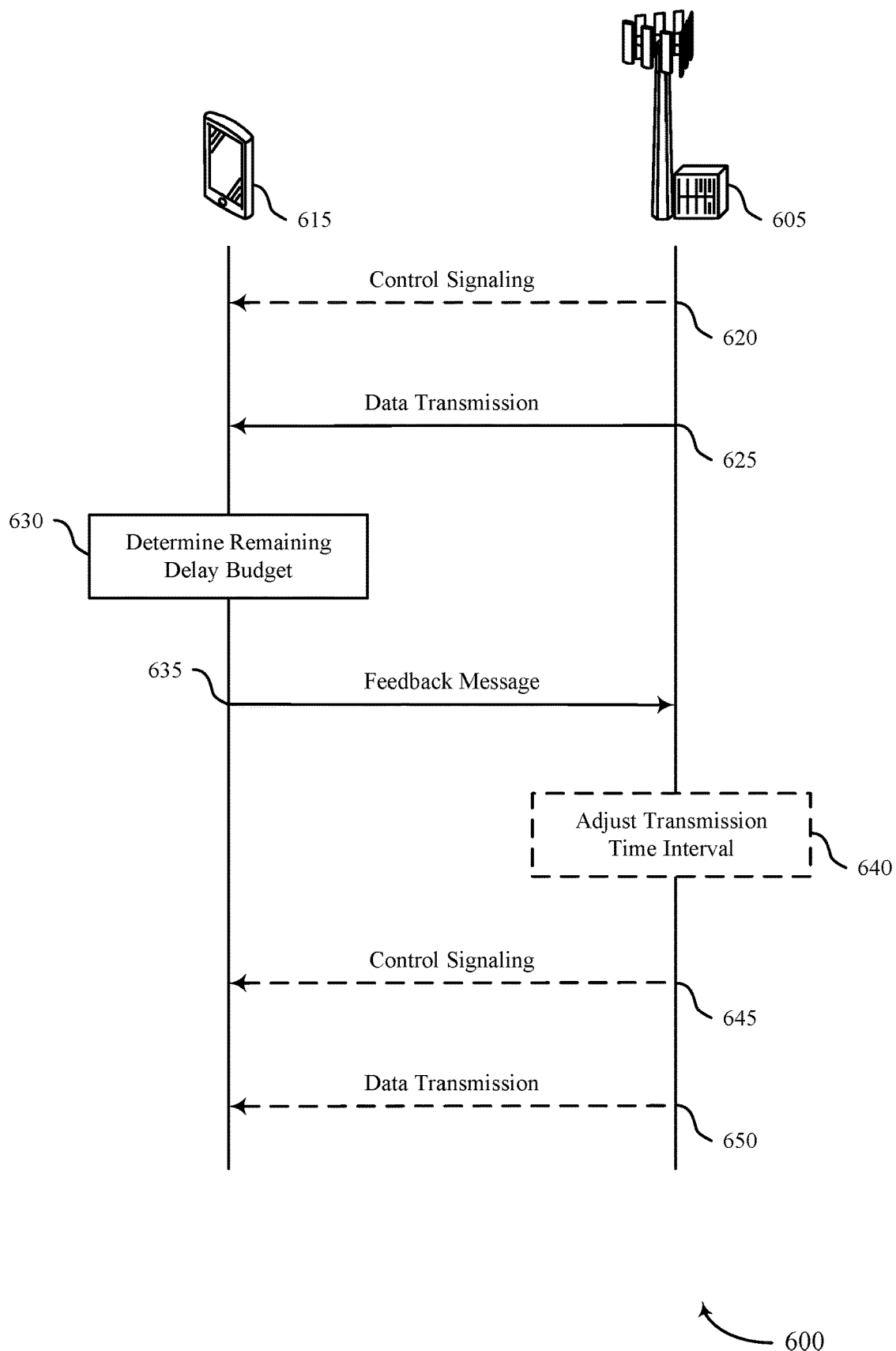
FIG. 6 illustrates an example of a process flow that supports feedback of remaining delay budget in accordance with aspects of the present disclosure.

FIG. 6 illustrates an example of a process flow 600 that supports feedback of remaining delay budget in accordance with aspects of the present disclosure. In some examples, process flow 600 may implement aspects of wireless communication systems 100 and 200. For example, the process flow 600 may include a base station 605 and a UE 615, which may be examples of the corresponding devices described with reference to FIGS. 1 and 2. In the following description of the process flow 600, the operations between the base station 605 and the UE 615 may be transmitted in a different order than the example order shown, or the operations performed by the base station 605 and the UE 615 may be performed in different orders or at different times. Some operations may also be omitted from the process flow 600, and other operations may be added to the process flow 600. The operations performed by the base station 605 and the UE 615 may support improvement to the UE 615 transmission operations and, in some examples, may promote improvements to the UE 615 reliability, among other benefits.

In some examples, at 620 the base station 605 may transmit control signaling to the UE 615 configuring a data transmission. The control signaling may indicate a packet delay budget associated with the data transmission based on a use case associated with a data packet in the data transmission. In some examples, the control signaling may include a PDCCH transmission, which may include a scheduling grant. In some examples, the control signaling may schedule an SPS pattern of data transmissions to the UE 615. Based on the control signaling, the UE 615 may determine a packet arrival time and a packet expiry time associated with the data packet.

At 625, the base station 605 may transmit the data transmission to the UE 615. The data transmission may include the data packet, for example for an XR application. In some examples, the data transmission may be included in a PDSCH transmission.

At 630, the UE 615 may determine a remaining delay budget associated with the packet delay budget. The remaining delay budget may be based on a processing time associated with the data packet. The UE 615 may determine to report the remaining delay budget to the base station 605, for example as a delay budget margin in a feedback message.

At 635, the UE may transmit the feedback message to the base station 605. In some examples, the feedback message may include an ACK message, or may be included in a PUCCH transmission. In some examples, the UE 615 may quantize the remaining delay budget in the delay budget margin included in the feedback message. For example, the UE 615 may report the remaining delay budget in terms of a quantity of slots, a quantized time value, or another quantization of the remaining delay budget, or a combination thereof.

In some examples, the UE 615 may report the remaining delay budget in a short-term manner, which may include reporting the remaining delay budget in each feedback message. Additionally or alternatively, the UE 615 may report the remaining delay budget in a long-term manner, for example in feedback corresponding to data transmissions that are part of the SPS pattern. For example, the UE 615 may report one or more statistics associated with the remaining delay budget in the feedback message in a PUCCH transmission. The one or more statistics may include a highest remaining delay budget, or an average remaining delay budget, or a number of top values of the remaining delay budget.

In some examples, at 640 the base station 605 may determine to adjust a transmission time interval of a subsequent data packet transmission within a packet delay budget based on the feedback message. For example, the base station 605 may determine to adjust a scheduling time for the subsequent data transmission to transmit a transmission earlier in a packet delay budget time interval for UE having lower processing capabilities, or to transmit a transmission later in a packet delay budget time interval for UE having higher processing capabilities. In some examples, the base station 605 may determine the UE 615 has a statistically low delay budget margin, and may determine to adjust the scheduling time to an earlier time, to allow the UE 615 more time to process the data packet within the packet delay budget. In some examples, the base station 605 may determine the UE 615 has a statistically high delay budget margin, and may determine to adjust the scheduling time to a later time within the packet delay budget to accommodate scheduling times for other UEs with lower delay budget margins.

In some examples, at 645 the base station 605 may transmit control signaling to the UE 615 configuring a second data transmission based on the reported feedback. The control signaling may indicate a packet delay budget associated with the second data transmission. In some examples, the control signaling may also indicate an adjusted scheduling time for the second data transmission. Based on the control signaling, the UE 615 may determine a packet arrival time and a packet expiry time associated with a data packet in the second data transmission. In some examples, at 650 the base station 605 may transmit the second data transmission, which may include the data packet.

The operations performed by the base station 605 and the UE 615 may therefore support improvements to the UE 615 packet processing operations and, in some examples, may promote improvements to the UE 615 reliability, among other benefits.

Figure 7:
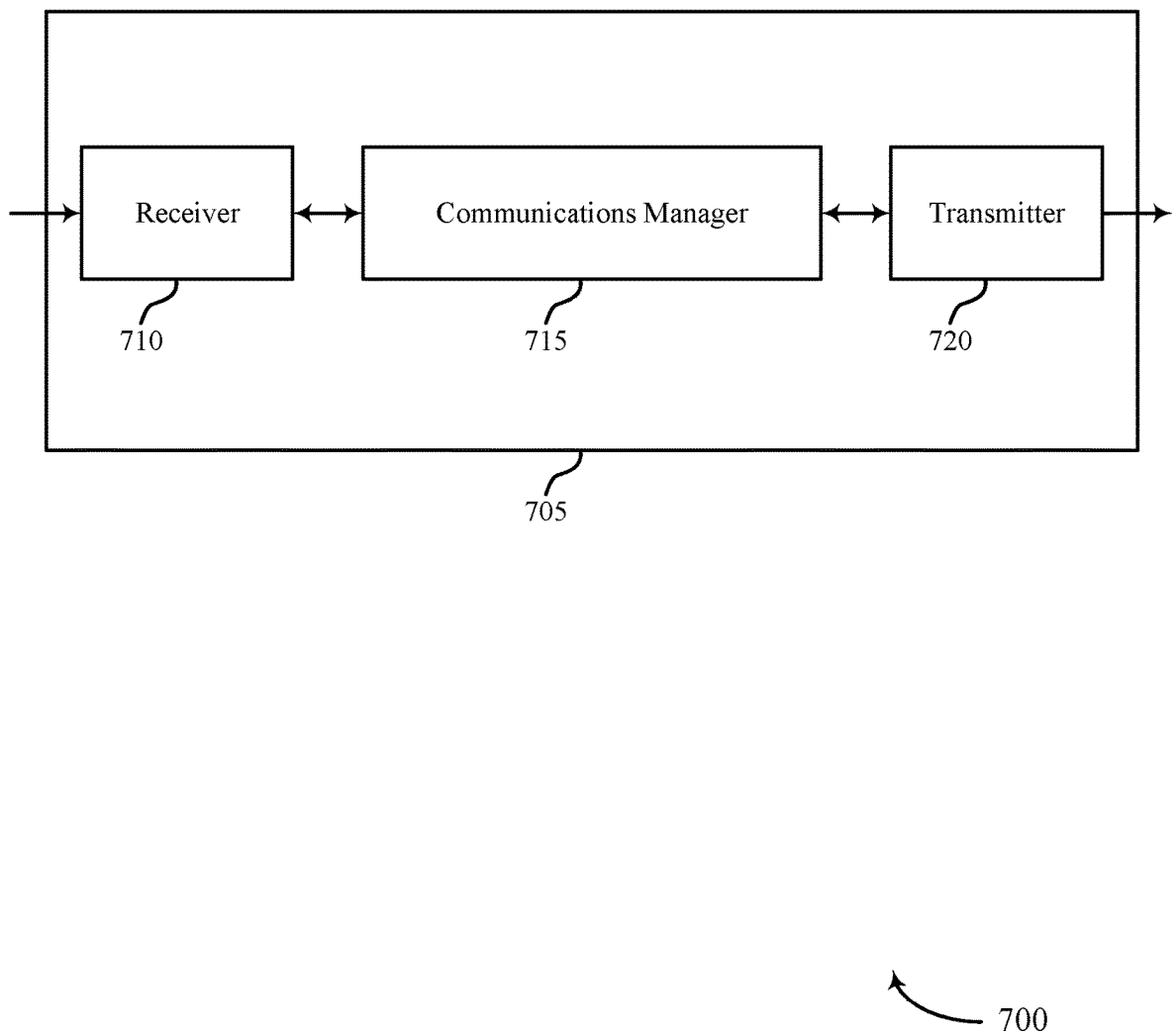
FIGS. 7 and 8 show diagrams of devices that support feedback of remaining delay budget in accordance with aspects of the present disclosure.

FIG. 7 shows a diagram 700 of a device 705 that supports feedback of remaining delay budget in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to feedback of remaining delay budget, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, a data transmission that includes an application packet and transmit a feedback message for the data transmission that includes an indicator of a remaining delay budget that is determined based on a processing time utilized for processing the application packet.

The communications manager 715 as described herein may be implemented to realize one or more potential advantages. One implementation may allow the device 705 to save power and increase battery life by communicating with a base station 105 (as shown in FIG. 1) more efficiently. For example, the device 705 may efficiently receive data packet transmission from a base station 105, as the device 705 may be able to report feedback to improve packet transmission timing. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
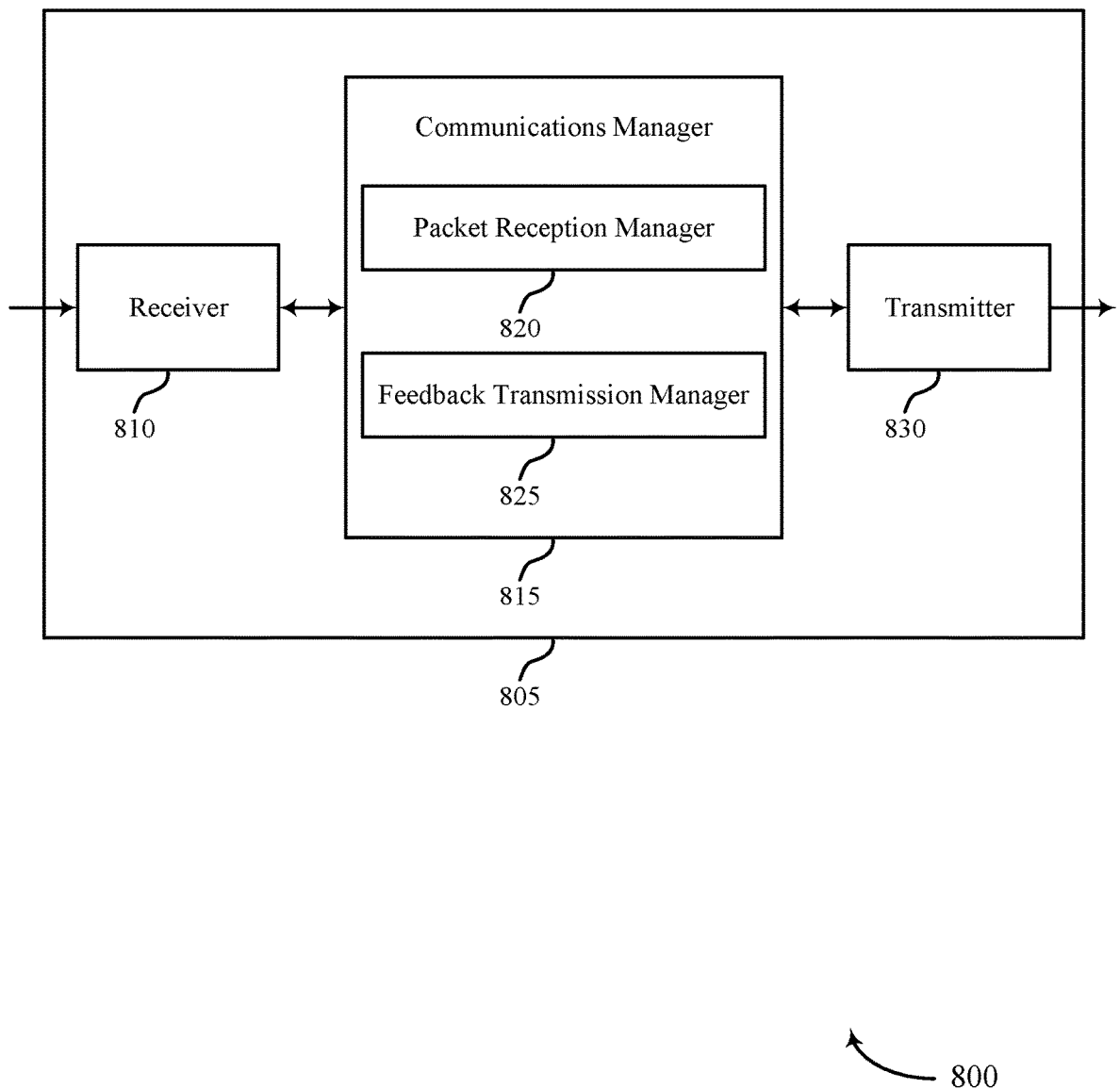

FIG. 8 shows a diagram 800 of a device 805 that supports feedback of remaining delay budget in accordance with aspects of the present disclosure. The device 805 may be an example of aspects of a device 705, or a UE 115 as described herein. The device 805 may include a receiver 810, a communications manager 815, and a transmitter 830. The device 805 may also include a processor. Each of these components may be in communication with one another (e.g., via one or more buses).

The receiver 810 may receive information such as packets, user data, or control information associated with various information channels (e.g., control channels, data channels, and information related to feedback of remaining delay budget, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a packet reception manager 820 and a feedback transmission manager 825. The communications manager 815 may be an example of aspects of the communications manager 1010 described herein.

The packet reception manager 820 may receive, from a base station, a data transmission that includes an application packet.

The feedback transmission manager 825 may transmit a feedback message for the data transmission that includes an indicator of a remaining delay budget that is determined based on a processing time utilized for processing the application packet.

The transmitter 830 may transmit signals generated by other components of the device 805. In some examples, the transmitter 830 may be collocated with a receiver 810 in a transceiver module. For example, the transmitter 830 may be an example of aspects of the transceiver 1020 described with reference to FIG. 10. The transmitter 830 may utilize a single antenna or a set of antennas.

Figure 9:
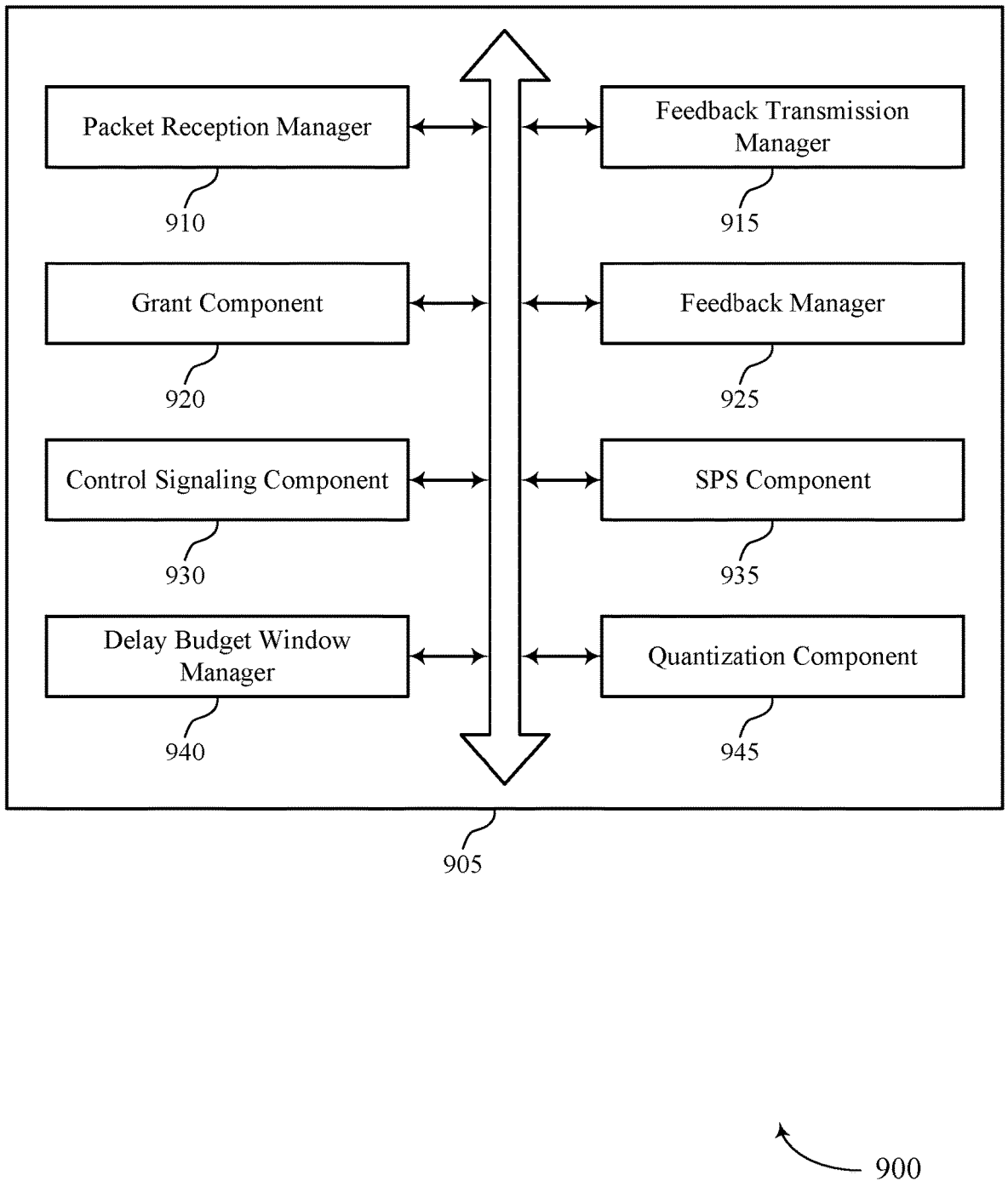
FIG. 9 shows a diagram of a communications manager that supports feedback of remaining delay budget in accordance with aspects of the present disclosure.

FIG. 9 shows a diagram 900 of a communications manager 905 that supports feedback of remaining delay budget in accordance with aspects of the present disclosure. The communications manager 905 may be an example of aspects of a communications manager 715, a communications manager 815, or a communications manager 1010 described herein. The communications manager 905 may include a packet reception manager 910, a feedback transmission manager 915, a grant component 920, a feedback manager 925, a control signaling component 930, an SPS component 935, a delay budget window manager 940, and a quantization component 945. Each of these modules may communicate, directly or indirectly, with one another (e.g., via one or more buses).

The packet reception manager 910 may receive, from a base station, a data transmission that includes an application packet. In some examples, the packet reception manager 910 may receive a second data transmission that includes a second application packet based on a grant. In some cases, the application packet includes extended reality data.

The feedback transmission manager 915 may transmit a feedback message for the data transmission that includes an indicator of a remaining delay budget that is determined based on a processing time utilized for processing the application packet. In some examples, the feedback transmission manager 915 may transmit a second feedback message for the second data transmission that includes a second indicator of a second remaining delay budget that is determined based on a second processing time utilized for processing the second application packet.

The grant component 920 may receive a grant that allocates an earlier transmission time interval within a packet delay budget time interval for a second data transmission to the UE based on the indicator of the remaining delay budget. In some examples, the grant component 920 may receive a grant that allocates a later transmission time interval within a packet delay budget time interval for a second data transmission to the UE based on the indicator of the remaining delay budget.

The feedback manager 925 may transmit a second feedback message for the second data transmission that includes a second indicator of a second remaining delay budget that is determined based on a second processing time utilized for processing the second application packet.

The control signaling component 930 may receive first control signaling that indicates a first semi-persistent scheduling pattern that allocates a first transmission time interval within a first packet delay budget time interval for the data transmission to the UE, where the data transmission is received within the first transmission time interval in accordance with the first semi-persistent scheduling pattern.

The SPS component 935 may receive second control signaling that indicates a second semi-persistent scheduling pattern that allocates a second transmission time interval within a second packet delay budget time interval for a second data transmission to the UE based on the indicator of the remaining delay budget. In some cases, the second transmission time interval occurs earlier within the second semi-persistent scheduling pattern than the first transmission time interval occurs within the first semi-persistent scheduling pattern. In some cases, the second transmission time interval occurs later within the second semi-persistent scheduling pattern than the first transmission time interval occurs within the first semi-persistent scheduling pattern.

The delay budget window manager 940 may transmit the feedback message for the data transmission that includes the indicator that is a function of a remaining delay budget determined for a set of packet delay budget windows. In some cases, the function of the remaining delay budget is a maximum remaining delay budget determined for the set of packet delay budget windows. In some cases, the function of the remaining delay budget is an average remaining delay budget determined for the set of packet delay budget windows. In some cases, the function of the remaining delay budget indicates a first set of one or more remaining delay budgets for the set of packet delay budget windows that are each longer than a second set of one or more remaining delay budgets for the set of packet delay budget windows.

The quantization component 945 may quantize the remaining delay budget to determine a number of transmission time intervals, where the indicator indicates the number of transmission time intervals. In some examples, the quantization component 945 may quantize the remaining delay budget to determine a quantized time value, where the indicator indicates the quantized time value.

Figure 10:
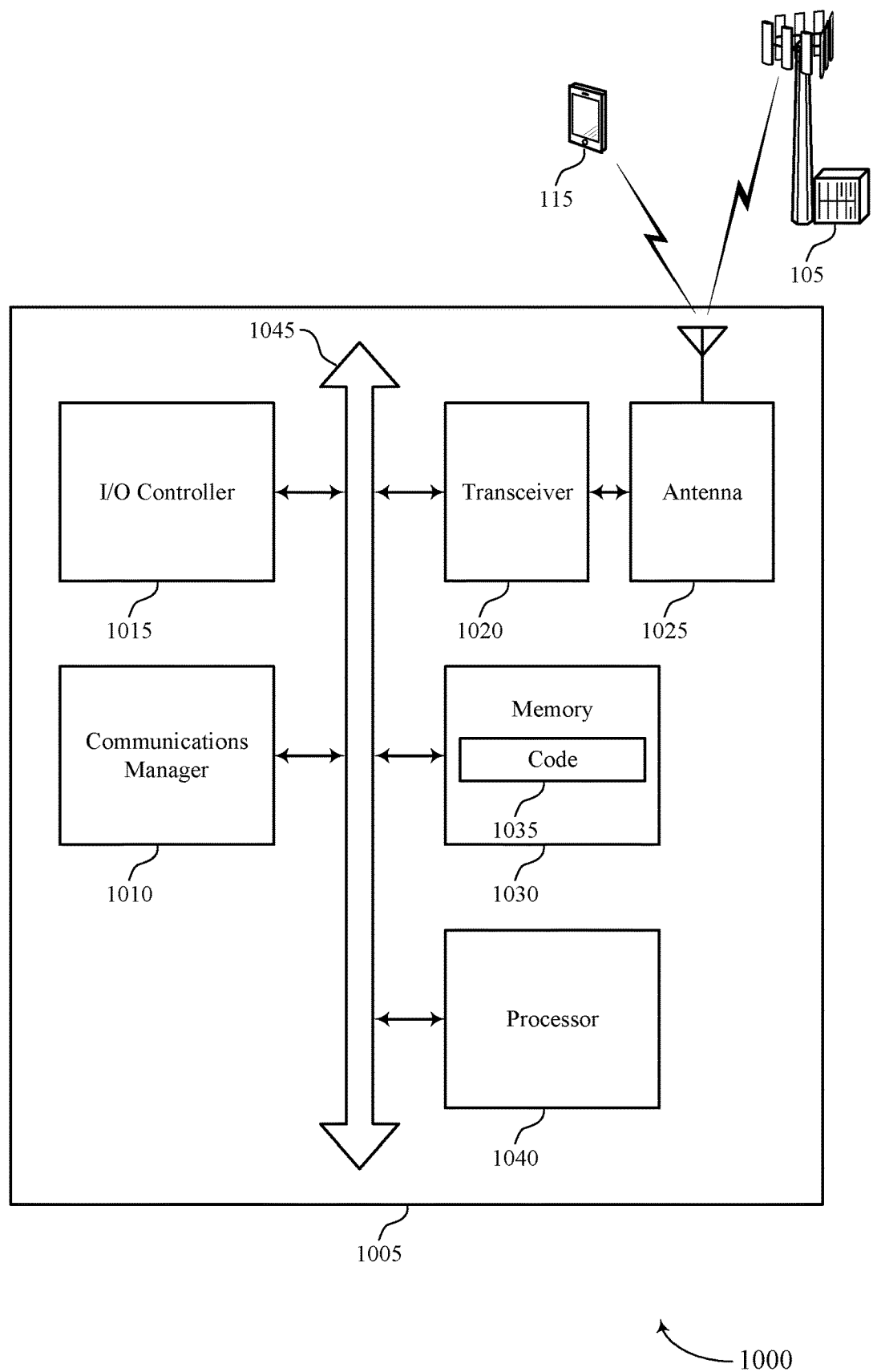
FIG. 10 shows a diagram of a system including a device that supports feedback of remaining delay budget in accordance with aspects of the present disclosure.

FIG. 10 shows a diagram of a system 1000 including a device 1005 that supports feedback of remaining delay budget in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, a data transmission that includes an application packet and transmit a feedback message for the data transmission that includes an indicator of a remaining delay budget that is determined based on a processing time utilized for processing the application packet.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting feedback of remaining delay budget).

The processor 1040 of the device 1005 (e.g., controlling the receiver 710, the transmitter 720, or the transceiver 1020) may reduce power consumption and increase packet processing efficiency based on transmitting the feedback message to the base station. In some examples, the processor 1040 of the device 1005 may reconfigure parameters for processing the received data transmission. For example, the processor 1040 of the device 1005 may turn on one or more processing units for processing the data transmission, increase a processing clock, or a similar mechanism within the device 1005. As such, when subsequent data transmissions are received, the processor 1040 may be ready to respond more efficiently through the reduction of a ramp up in processing power. The improvements in power saving and data transmission processing efficiency may further increase battery life at the device 1005 (for example, by reducing or eliminating unnecessary or failed data transmissions, etc.).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
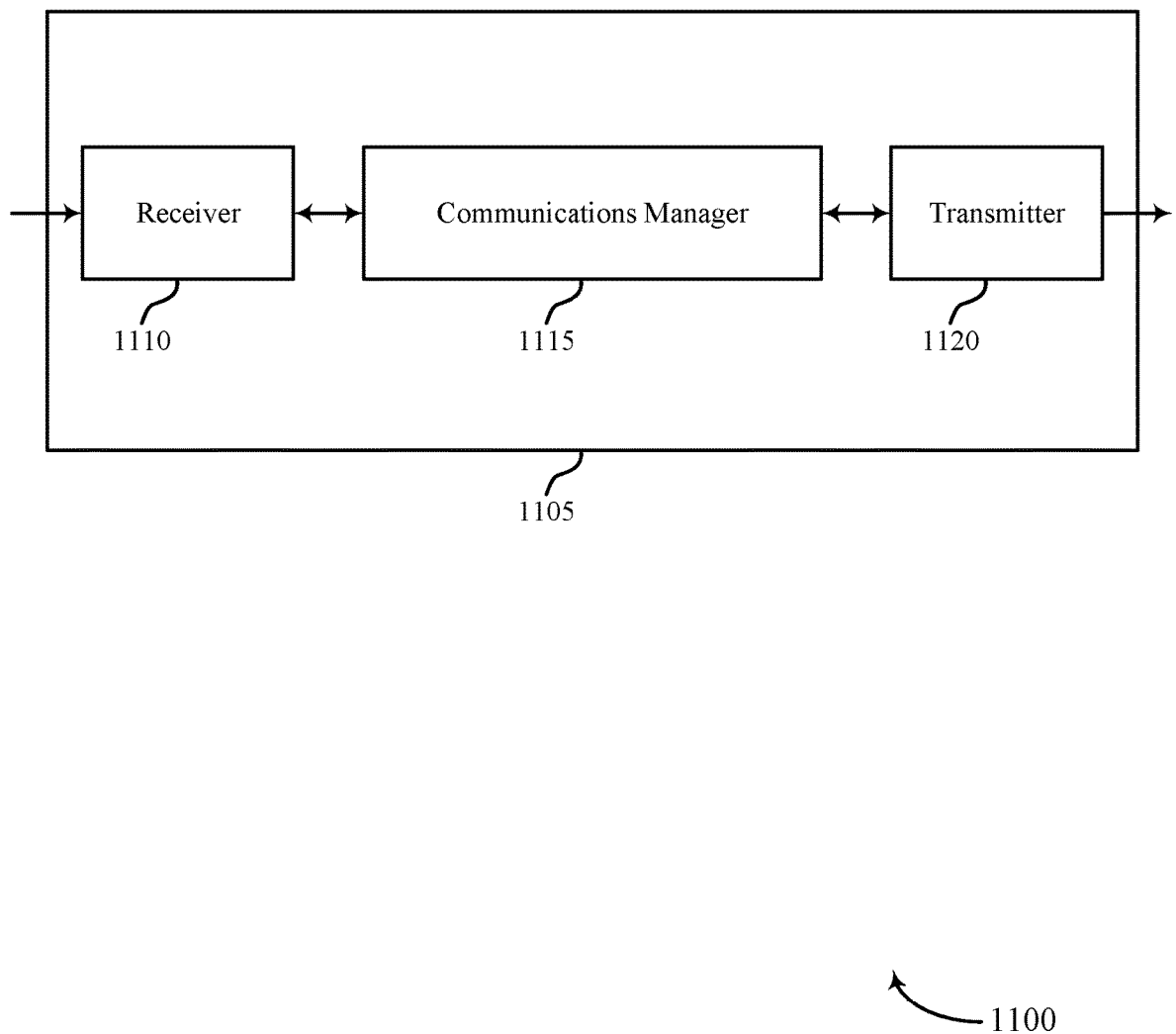
FIGS. 11 and 12 show diagrams of devices that support feedback of remaining delay budget in accordance with aspects of the present disclosure.

FIG. 11 shows a diagram 1100 of a device 1105 that supports feedback of remaining delay budget in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to feedback of remaining delay budget, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE, a data transmission that includes an application packet and receive a feedback message for the data transmission that includes an indicator of a remaining delay budget that is determined based on a processing time utilized for processing the application packet.

The communications manager 1115 as described herein may be implemented to realize one or more potential advantages. One implementation may allow the device 1105 to save power by communicating with a UE 115 (as shown in FIG. 1) more efficiently. For example, the device 1105 may improve data transmission reliability in communications with a UE 115, as the device 1105 may be able to determine a processing capability of the UE 115 and adjust data transmissions accordingly. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
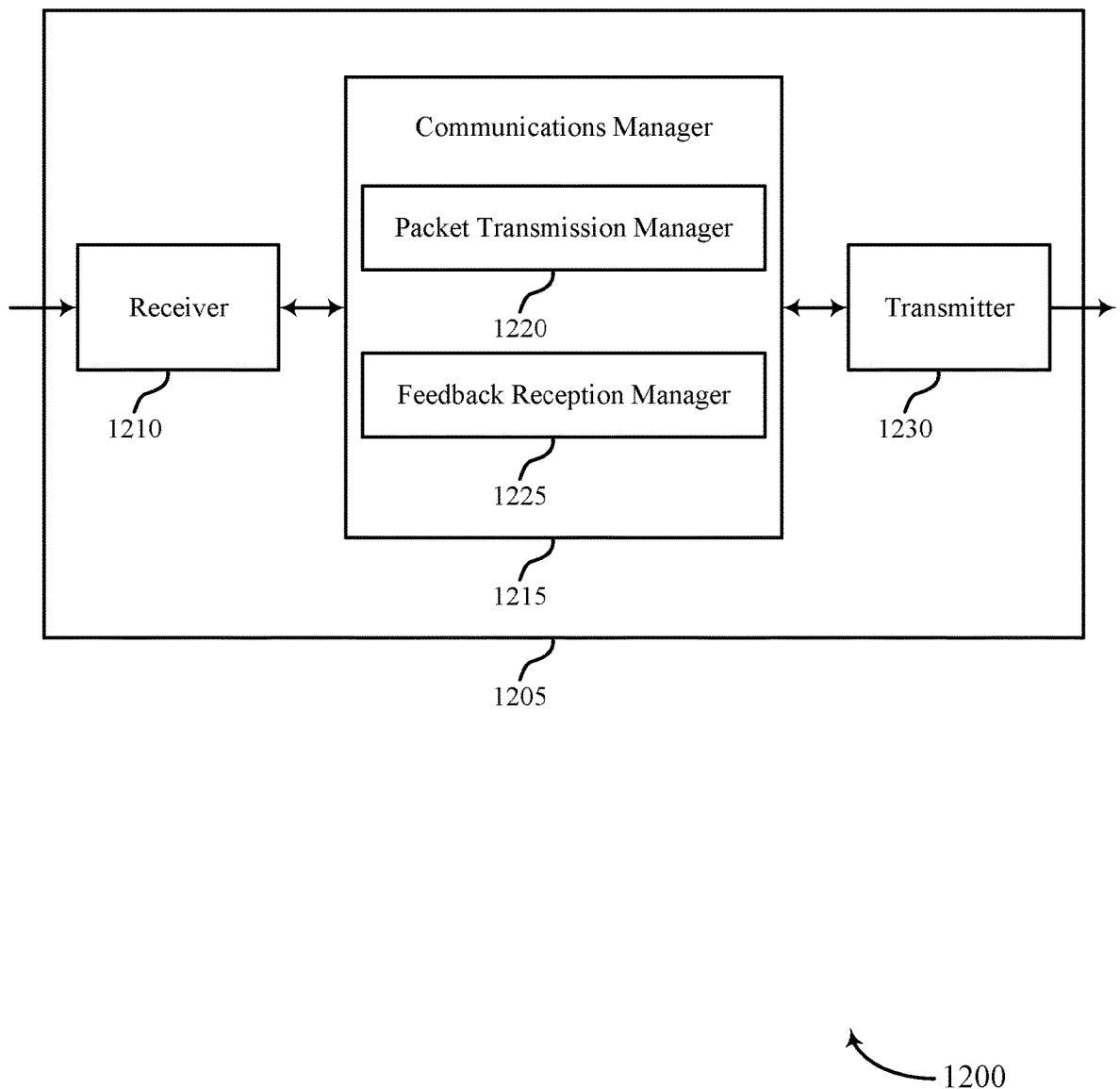

FIG. 12 shows a diagram 1200 of a device 1205 that supports feedback of remaining delay budget in accordance with aspects of the present disclosure. The device 1205 may be an example of aspects of a device 1105, or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to feedback of remaining delay budget, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a packet transmission manager 1220 and a feedback reception manager 1225. The communications manager 1215 may be an example of aspects of the communications manager 1410 described herein.

The packet transmission manager 1220 may transmit, to a UE, a data transmission that includes an application packet.

The feedback reception manager 1225 may receive a feedback message for the data transmission that includes an indicator of a remaining delay budget that is determined based on a processing time utilized for processing the application packet.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
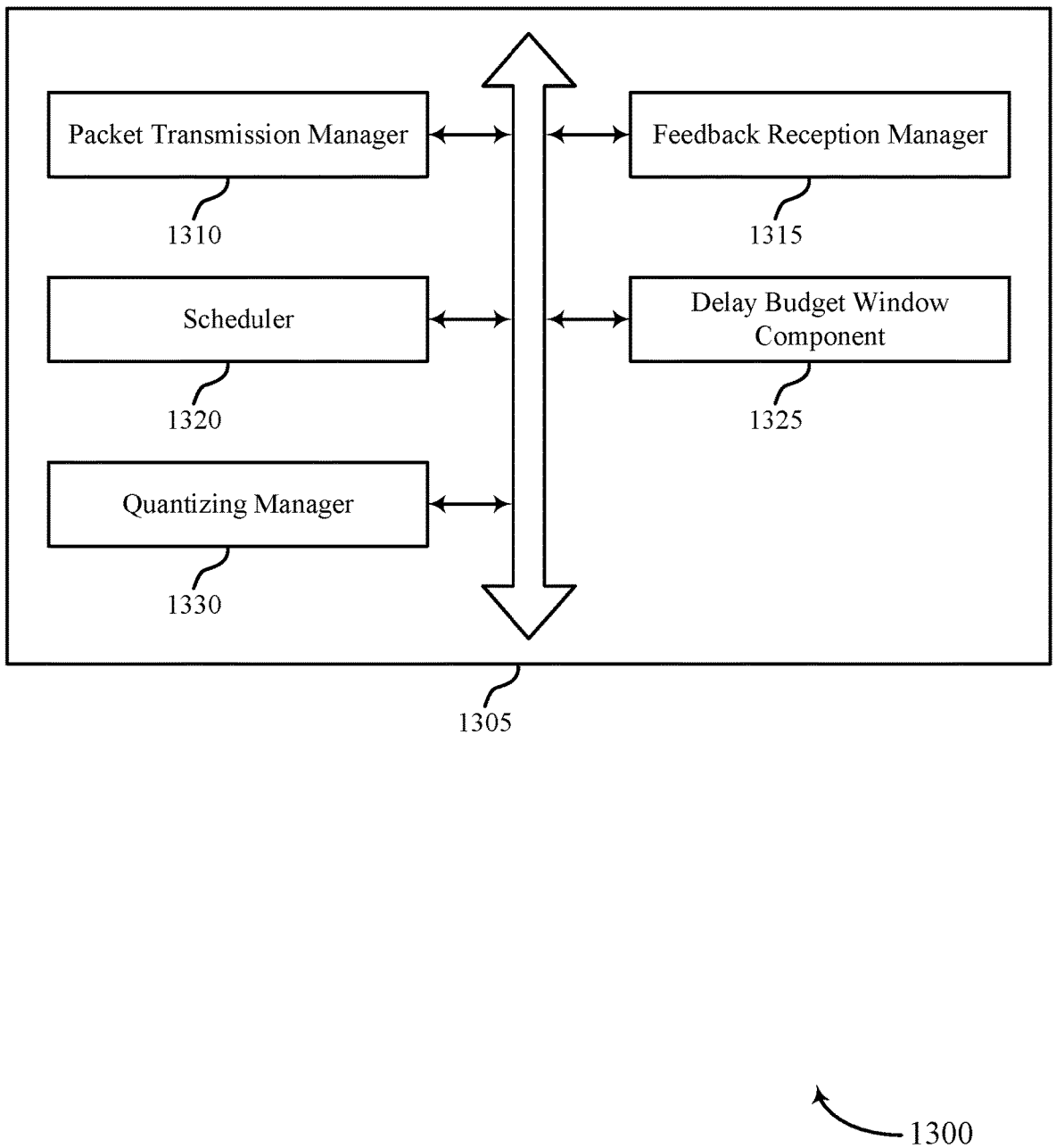
FIG. 13 shows a diagram of a communications manager that supports feedback of remaining delay budget in accordance with aspects of the present disclosure.

FIG. 13 shows a diagram 1300 of a communications manager 1305 that supports feedback of remaining delay budget in accordance with aspects of the present disclosure. The communications manager 1305 may be an example of aspects of a communications manager 1115, a communications manager 1215, or a communications manager 1410 described herein. The communications manager 1305 may include a packet transmission manager 1310, a feedback reception manager 1315, a scheduler 1320, a delay budget window component 1325, and a quantizing manager 1330. Each of these modules may communicate, directly or indirectly, with one another (e.g., via one or more buses).

The packet transmission manager 1310 may transmit, to a UE, a data transmission that includes an application packet. In some examples, the packet transmission manager 1310 may transmit a second data transmission that includes a second application packet based on a grant. In some cases, the application packet includes extended reality data.

The feedback reception manager 1315 may receive a feedback message for the data transmission that includes an indicator of a remaining delay budget that is determined based on a processing time utilized for processing the application packet. In some examples, the feedback reception manager 1315 may receive a second feedback message for the second data transmission that includes a second indicator of a second remaining delay budget that is determined based on a second processing time utilized for processing the second application packet.

The scheduler 1320 may transmit a grant that allocates an earlier transmission time interval within a packet delay budget time interval for a second data transmission to the UE based on the indicator of the remaining delay budget. In some examples, the scheduler 1320 may transmit a grant that allocates a later transmission time interval within a packet delay budget time interval for a second data transmission to the UE based on the indicator of the remaining delay budget.

In some examples, the scheduler 1320 may transmit first control signaling that indicates a first semi-persistent scheduling pattern that allocates a first transmission time interval within a first packet delay budget time interval for the data transmission to the UE, where the data transmission is transmitted within the first transmission time interval in accordance with the first semi-persistent scheduling pattern. In some examples, the scheduler 1320 may transmit second control signaling that indicates a second semi-persistent scheduling pattern that allocates a second transmission time interval within a second packet delay budget time interval for a second data transmission to the UE based on the indicator of the remaining delay budget. In some cases, the second transmission time interval occurs earlier within the second semi-persistent scheduling pattern than the first transmission time interval occurs within the first semi-persistent scheduling pattern. In some cases, the second transmission time interval occurs later within the second semi-persistent scheduling pattern than the first transmission time interval occurs within the first semi-persistent scheduling pattern.

The delay budget window component 1325 may receive the feedback message for the data transmission that includes the indicator that is a function of a remaining delay budget determined for a set of packet delay budget windows. In some cases, the function of the remaining delay budget is a maximum remaining delay budget determined for the set of packet delay budget windows. In some cases, the function of the remaining delay budget is an average remaining delay budget determined for the set of packet delay budget windows. In some cases, the function of the remaining delay budget indicates a first set of one or more remaining delay budgets for the set of packet delay budget windows that are each longer than a second set of one or more remaining delay budgets for the set of packet delay budget windows.

The quantizing manager 1330 may quantize the remaining delay budget to determine a number of transmission time intervals, where the indicator indicates the number of transmission time intervals. In some examples, the quantizing manager 1330 may quantize the remaining delay budget to determine a quantized time value, where the indicator indicates the quantized time value.

Figure 14:
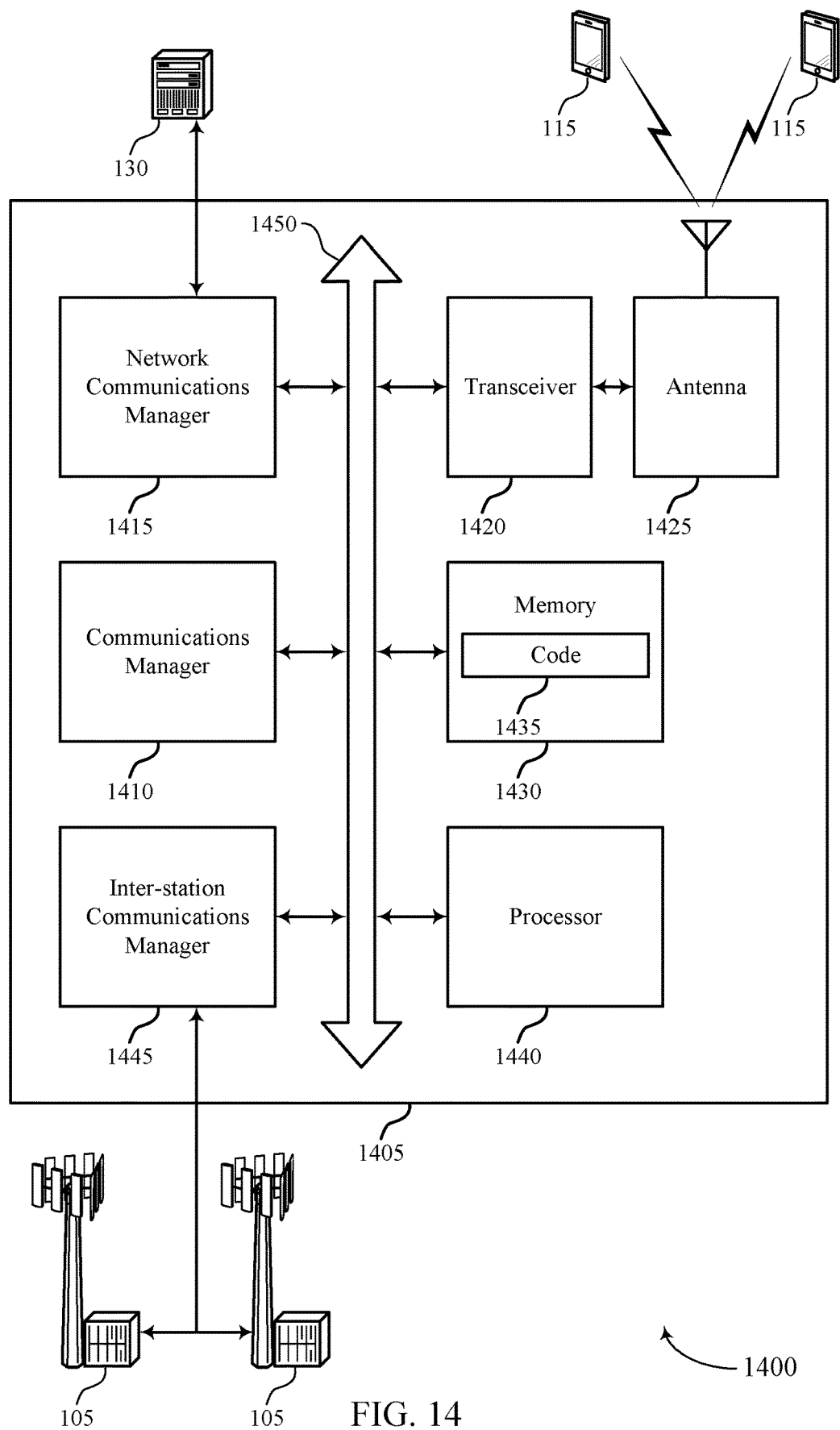
FIG. 14 shows a diagram of a system including a device that supports feedback of remaining delay budget in accordance with aspects of the present disclosure.

FIG. 14 shows a diagram of a system 1400 including a device 1405 that supports feedback of remaining delay budget in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a UE, a data transmission that includes an application packet and receive a feedback message for the data transmission that includes an indicator of a remaining delay budget that is determined based on a processing time utilized for processing the application packet.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting feedback of remaining delay budget).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
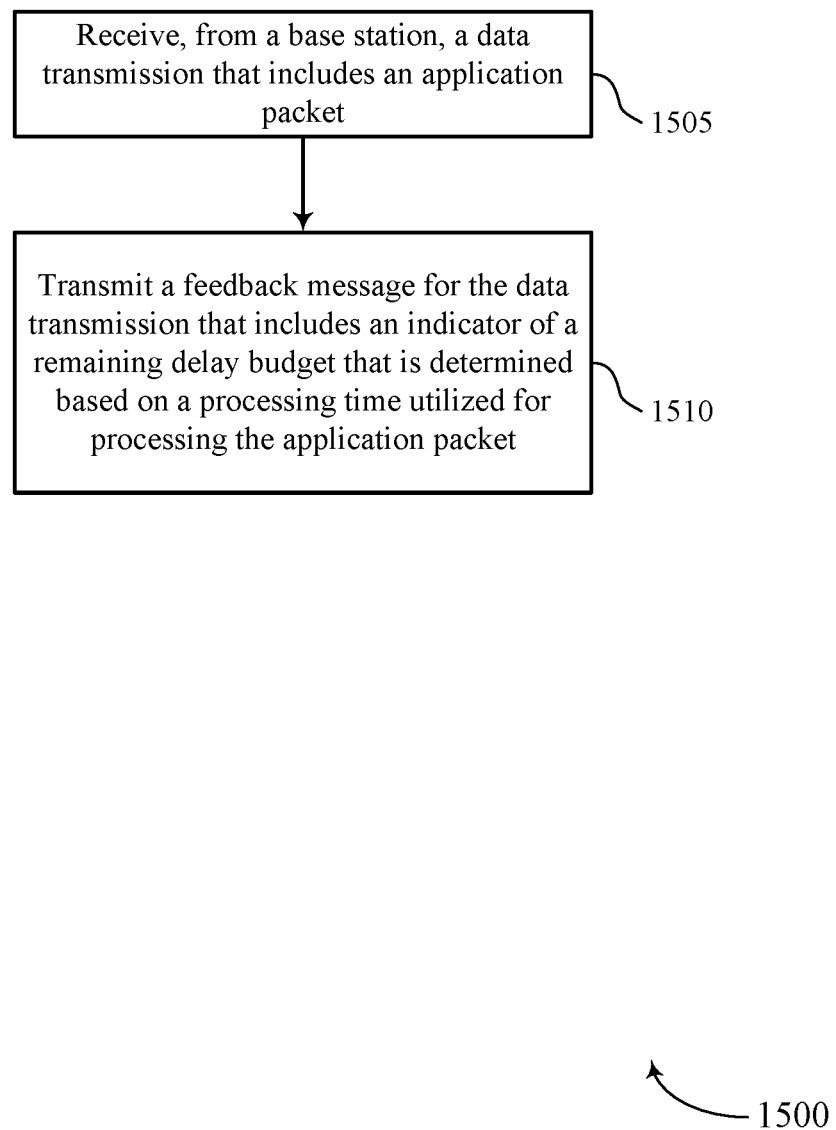
FIGS. 15 through 20 show flowcharts illustrating methods that support feedback of remaining delay budget in accordance with aspects of the present disclosure.

FIG. 15 shows a flowchart illustrating a method 1500 that supports feedback of remaining delay budget in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a data transmission that includes an application packet. The operations of 1505 may be performed according to the methods described herein. In some examples, aspects of the operations of 1505 may be performed by a packet reception manager as described with reference to FIGS. 7 through 10.

At 1510, the UE may transmit a feedback message for the data transmission that includes an indicator of a remaining delay budget that is determined based on a processing time utilized for processing the application packet. The operations of 1510 may be performed according to the methods described herein. In some examples, aspects of the operations of 1510 may be performed by a feedback transmission manager as described with reference to FIGS. 7 through 10.

Figure 16:
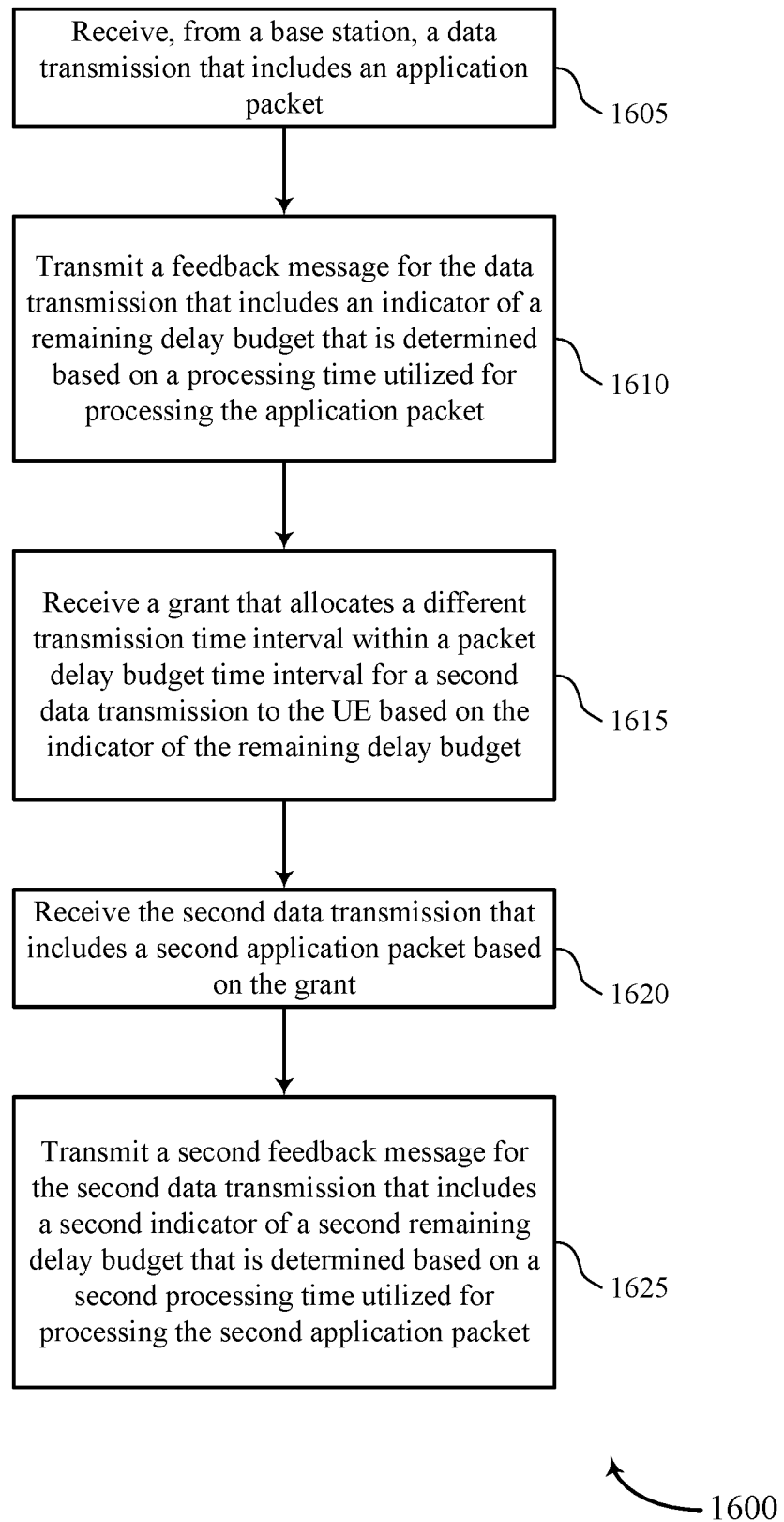

FIG. 16 shows a flowchart illustrating a method 1600 that supports feedback of remaining delay budget in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a data transmission that includes an application packet. The operations of 1605 may be performed according to the methods described herein. In some examples, aspects of the operations of 1605 may be performed by a packet reception manager as described with reference to FIGS. 7 through 10.

At 1610, the UE may transmit a feedback message for the data transmission that includes an indicator of a remaining delay budget that is determined based on a processing time utilized for processing the application packet. The operations of 1610 may be performed according to the methods described herein. In some examples, aspects of the operations of 1610 may be performed by a feedback transmission manager as described with reference to FIGS. 7 through 10.

At 1615, the UE may receive a grant that allocates a different (e.g., earlier or later) transmission time interval within a packet delay budget time interval for a second data transmission to the UE based on the indicator of the remaining delay budget. The operations of 1615 may be performed according to the methods described herein. In some examples, aspects of the operations of 1615 may be performed by a grant component as described with reference to FIGS. 7 through 10.

At 1620, the UE may receive the second data transmission that includes a second application packet based on the grant. The operations of 1620 may be performed according to the methods described herein. In some examples, aspects of the operations of 1620 may be performed by a packet reception manager as described with reference to FIGS. 7 through 10.

At 1625, the UE may transmit a second feedback message for the second data transmission that includes a second indicator of a second remaining delay budget that is determined based on a second processing time utilized for processing the second application packet. The operations of 1625 may be performed according to the methods described herein. In some examples, aspects of the operations of 1625 may be performed by a feedback transmission manager as described with reference to FIGS. 7 through 10.

Figure 17:
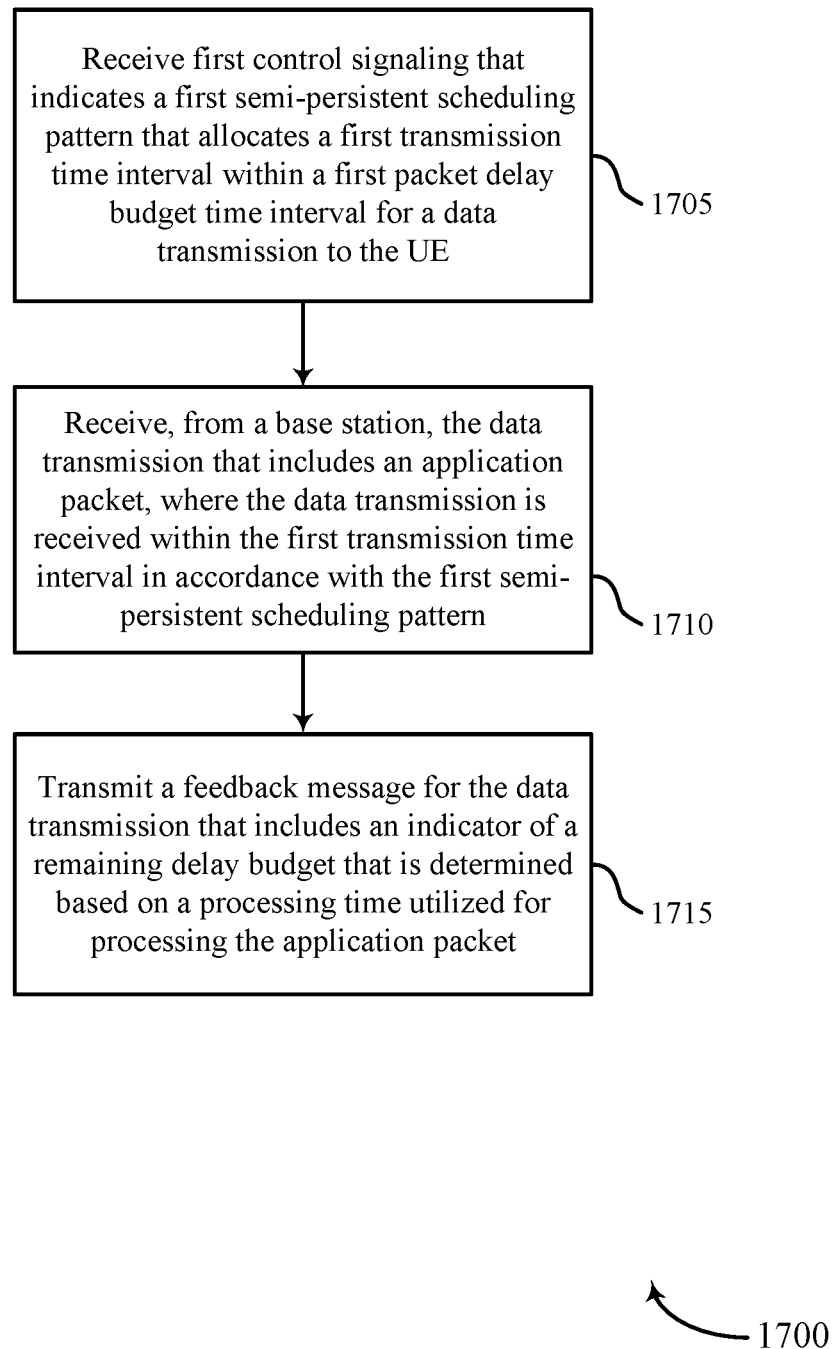

FIG. 17 shows a flowchart illustrating a method 1700 that supports feedback of remaining delay budget in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive first control signaling that indicates a first semi-persistent scheduling pattern that allocates a first transmission time interval within a first packet delay budget time interval for a data transmission to the UE. The operations of 1705 may be performed according to the methods described herein. In some examples, aspects of the operations of 1705 may be performed by a control signaling component as described with reference to FIGS. 7 through 10.

At 1710, the UE may receive, from a base station, the data transmission that includes an application packet, where the data transmission is received within the first transmission time interval in accordance with the first semi-persistent scheduling pattern. The operations of 1710 may be performed according to the methods described herein. In some examples, aspects of the operations of 1710 may be performed by a packet reception manager as described with reference to FIGS. 7 through 10.

At 1715, the UE may transmit a feedback message for the data transmission that includes an indicator of a remaining delay budget that is determined based on a processing time utilized for processing the application packet. The operations of 1715 may be performed according to the methods described herein. In some examples, aspects of the operations of 1715 may be performed by a feedback transmission manager as described with reference to FIGS. 7 through 10.

Figure 18:
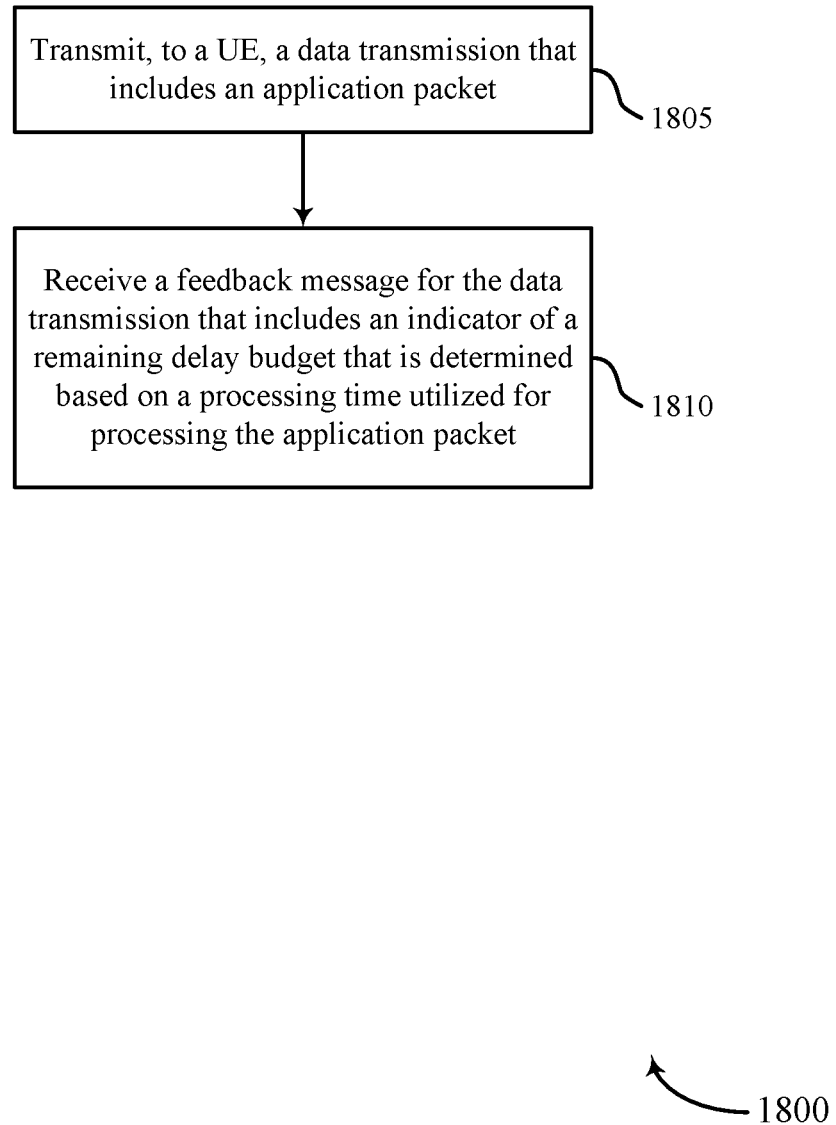

FIG. 18 shows a flowchart illustrating a method 1800 that supports feedback of remaining delay budget in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, a data transmission that includes an application packet. The operations of 1805 may be performed according to the methods described herein. In some examples, aspects of the operations of 1805 may be performed by a packet transmission manager as described with reference to FIGS. 11 through 14.

At 1810, the base station may receive a feedback message for the data transmission that includes an indicator of a remaining delay budget that is determined based on a processing time utilized for processing the application packet. The operations of 1810 may be performed according to the methods described herein. In some examples, aspects of the operations of 1810 may be performed by a feedback reception manager as described with reference to FIGS. 11 through 14.

Figure 19:
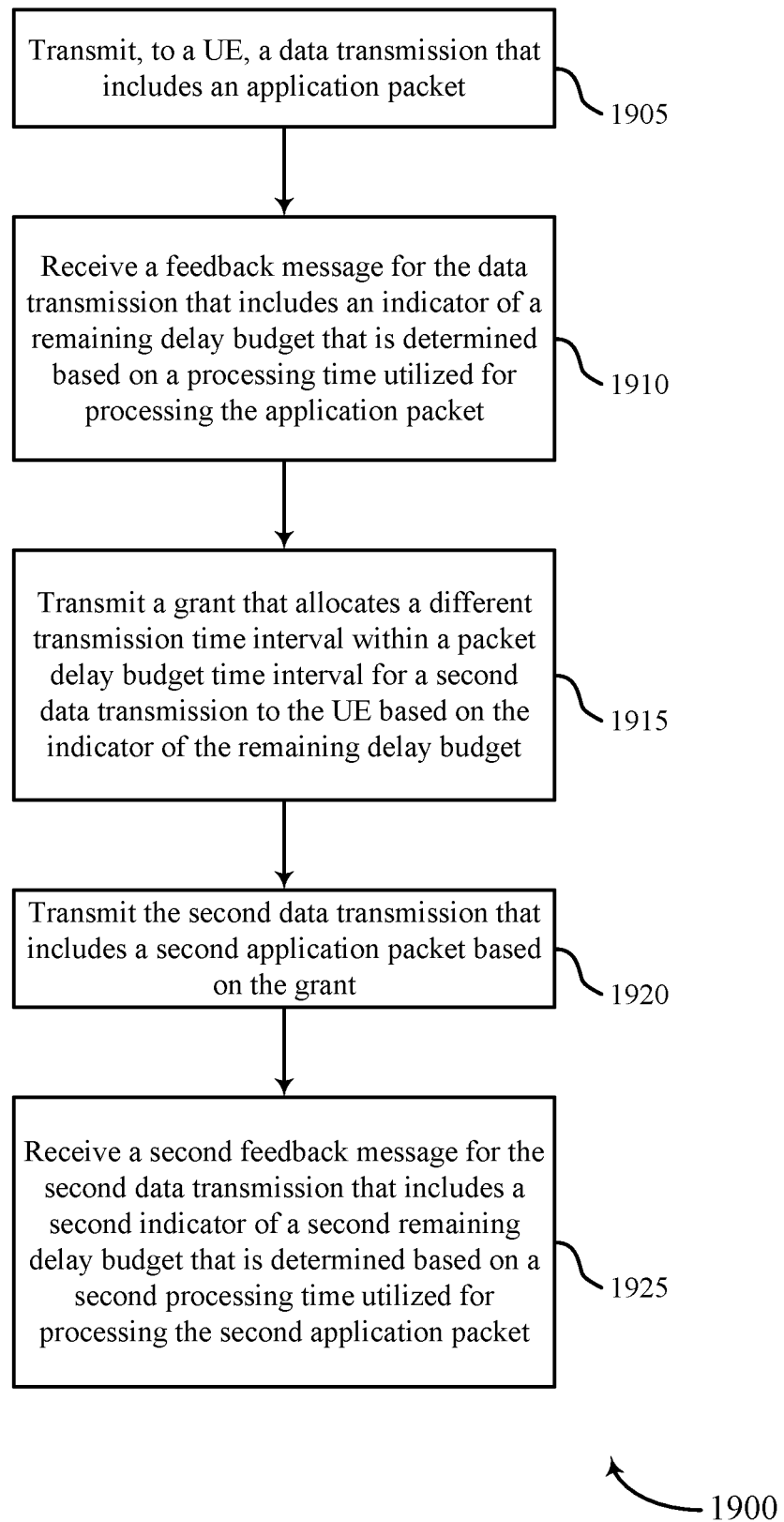

FIG. 19 shows a flowchart illustrating a method 1900 that supports feedback of remaining delay budget in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, a data transmission that includes an application packet. The operations of 1905 may be performed according to the methods described herein. In some examples, aspects of the operations of 1905 may be performed by a packet transmission manager as described with reference to FIGS. 11 through 14.

At 1910, the base station may receive a feedback message for the data transmission that includes an indicator of a remaining delay budget that is determined based on a processing time utilized for processing the application packet. The operations of 1910 may be performed according to the methods described herein. In some examples, aspects of the operations of 1910 may be performed by a feedback reception manager as described with reference to FIGS. 11 through 14.

At 1915, the base station may transmit a grant that allocates a different (e.g., earlier or later) transmission time interval within a packet delay budget time interval for a second data transmission to the UE based on the indicator of the remaining delay budget. The operations of 1915 may be performed according to the methods described herein. In some examples, aspects of the operations of 1915 may be performed by a scheduler as described with reference to FIGS. 11 through 14.

At 1920, the base station may transmit the second data transmission that includes a second application packet based on the grant. The operations of 1920 may be performed according to the methods described herein. In some examples, aspects of the operations of 1920 may be performed by a packet transmission manager as described with reference to FIGS. 11 through 14.

At 1925, the base station may receive a second feedback message for the second data transmission that includes a second indicator of a second remaining delay budget that is determined based on a second processing time utilized for processing the second application packet. The operations of 1925 may be performed according to the methods described herein. In some examples, aspects of the operations of 1925 may be performed by a feedback reception manager as described with reference to FIGS. 11 through 14.

Figure 20:
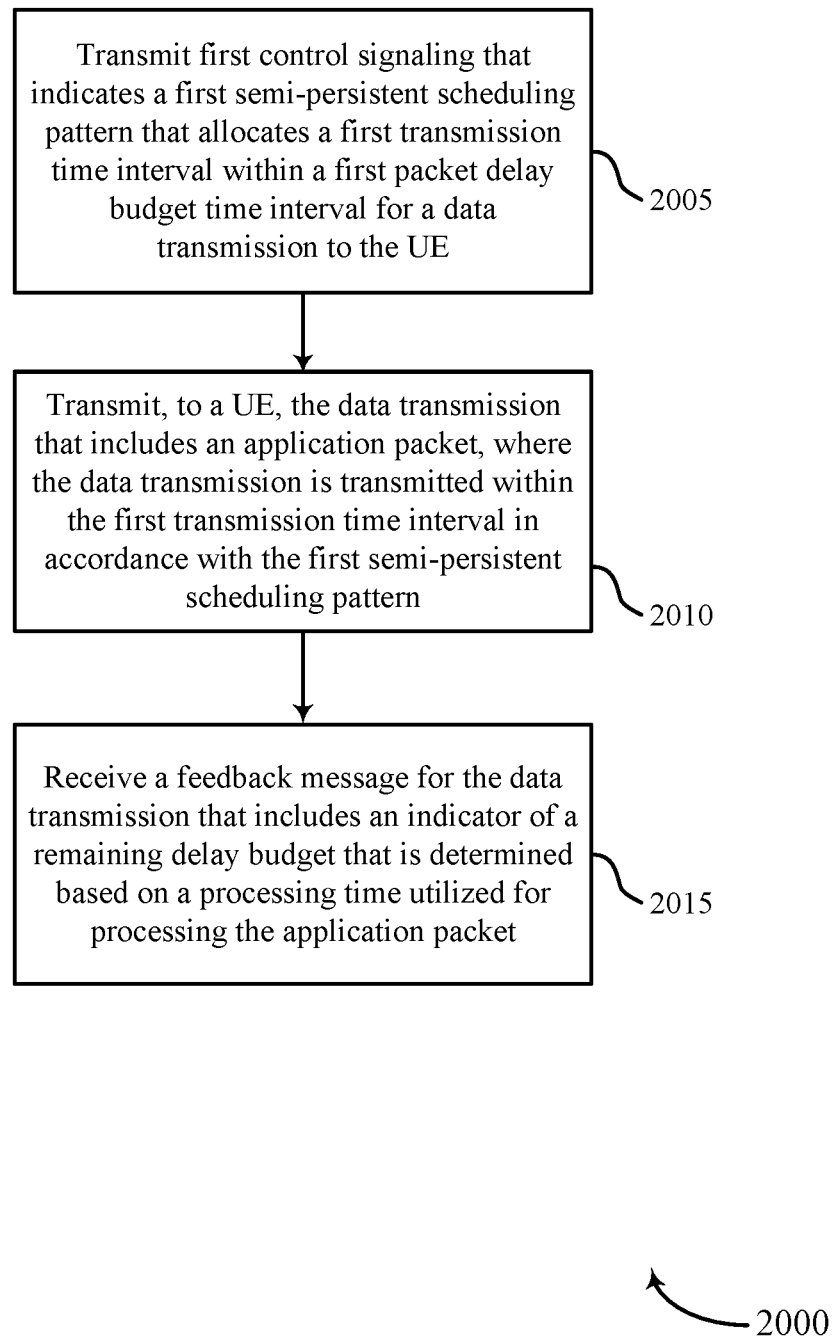

FIG. 20 shows a flowchart illustrating a method 2000 that supports feedback of remaining delay budget in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may transmit first control signaling that indicates a first semi-persistent scheduling pattern that allocates a first transmission time interval within a first packet delay budget time interval for a data transmission to the UE. The operations of 2005 may be performed according to the methods described herein. In some examples, aspects of the operations of 2005 may be performed by a scheduler as described with reference to FIGS. 11 through 14.

At 2010, the base station may transmit, to a UE, the data transmission that includes an application packet, where the data transmission is transmitted within the first transmission time interval in accordance with the first semi-persistent scheduling pattern. The operations of 2010 may be performed according to the methods described herein. In some examples, aspects of the operations of 2010 may be performed by a packet transmission manager as described with reference to FIGS. 11 through 14.

At 2015, the base station may receive a feedback message for the data transmission that includes an indicator of a remaining delay budget that is determined based on a processing time utilized for processing the application packet. The operations of 2015 may be performed according to the methods described herein. In some examples, aspects of the operations of 2015 may be performed by a feedback reception manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
  receiving, from a network device, a data transmission that comprises an application packet; and
  transmitting a feedback message for the data transmission that comprises an indicator of a remaining delay budget that is determined based at least in part on a processing time utilized for processing the application packet.

2. The method of claim 1, further comprising:
  receiving a grant that allocates an earlier transmission time interval within a packet delay budget time interval for a second data transmission to the UE based at least in part on the indicator of the remaining delay budget.

3. The method of claim 2, further comprising:
  receiving the second data transmission that comprises a second application packet based at least in part on the grant; and
  transmitting a second feedback message for the second data transmission that comprises a second indicator of a second remaining delay budget that is determined based at least in part on a second processing time utilized for processing the second application packet.

4. The method of claim 1, further comprising:
  receiving a grant that allocates a later transmission time interval within a packet delay budget time interval for a second data transmission to the UE based at least in part on the indicator of the remaining delay budget.

5. The method of claim 4, further comprising:
  receiving the second data transmission that comprises a second application packet based at least in part on the grant; and
  transmitting a second feedback message for the second data transmission that comprises a second indicator of a second remaining delay budget that is determined based at least in part on a second processing time utilized for processing the second application packet.

6. The method of claim 1, further comprising:
  receiving first control signaling that indicates a first semi-persistent scheduling pattern that allocates a first transmission time interval within a first packet delay budget time interval for the data transmission to the UE, wherein the data transmission is received within the first transmission time interval in accordance with the first semi-persistent scheduling pattern.

7. The method of claim 6, further comprising:
receiving second control signaling that indicates a second semi-persistent scheduling pattern that allocates a second transmission time interval within a second packet delay budget time interval for a second data transmission to the UE based at least in part on the indicator of the remaining delay budget.

8. The method of claim 7, wherein the second transmission time interval occurs earlier within the second semi-persistent scheduling pattern than the first transmission time interval occurs within the first semi-persistent scheduling pattern.

9. The method of claim 7, wherein the second transmission time interval occurs later within the second semi-persistent scheduling pattern than the first transmission time interval occurs within the first semi-persistent scheduling pattern.

10. The method of claim 1, wherein transmitting the feedback message for the data transmission that comprises the indicator comprises:
transmitting the feedback message for the data transmission that comprises the indicator that is a function of a remaining delay budget determined for a plurality of packet delay budget windows.

11. The method of claim 10, wherein the function of the remaining delay budget is a maximum remaining delay budget determined for the plurality of packet delay budget windows.

12. The method of claim 10, wherein the function of the remaining delay budget is an average remaining delay budget determined for the plurality of packet delay budget windows.

13. The method of claim 10, wherein the function of the remaining delay budget indicates a first set of one or more remaining delay budgets for the plurality of packet delay budget windows that are each longer than a second set of one or more remaining delay budgets for the plurality of packet delay budget windows.

14. The method of claim 1, further comprising:
quantizing the remaining delay budget to determine a number of transmission time intervals, wherein the indicator indicates the number of transmission time intervals.

15. The method of claim 1, further comprising:
quantizing the remaining delay budget to determine a quantized time value, wherein the indicator indicates the quantized time value.

16. The method of claim 1, wherein the application packet comprises extended reality data.

17. A method for wireless communications by a network device, comprising:
transmitting, to a user equipment (UE), a data transmission that comprises an application packet; and
receiving a feedback message for the data transmission that comprises an indicator of a remaining delay budget that is determined based at least in part on a processing time utilized for processing the application packet.

18. The method of claim 17, further comprising:
transmitting a grant that allocates an earlier transmission time interval within a packet delay budget time interval for a second data transmission to the UE based at least in part on the indicator of the remaining delay budget.

19. The method of claim 18, further comprising:
transmitting the second data transmission that comprises a second application packet based at least in part on the grant; and
receiving a second feedback message for the second data transmission that comprises a second indicator of a second remaining delay budget that is determined based at least in part on a second processing time utilized for processing the second application packet.

20. The method of claim 17, further comprising:
transmitting a grant that allocates a later transmission time interval within a packet delay budget time interval for a second data transmission to the UE based at least in part on the indicator of the remaining delay budget.

21. The method of claim 20, further comprising:
transmitting the second data transmission that comprises a second application packet based at least in part on the grant; and
receiving a second feedback message for the second data transmission that comprises a second indicator of a second remaining delay budget that is determined based at least in part on a second processing time utilized for processing the second application packet.

22. The method of claim 17, further comprising:
transmitting first control signaling that indicates a first semi-persistent scheduling pattern that allocates a first transmission time interval within a first packet delay budget time interval for the data transmission to the UE, wherein the data transmission is transmitted within the first transmission time interval in accordance with the first semi-persistent scheduling pattern.

23. The method of claim 22, further comprising:
transmitting second control signaling that indicates a second semi-persistent scheduling pattern that allocates a second transmission time interval within a second packet delay budget time interval for a second data transmission to the UE based at least in part on the indicator of the remaining delay budget.

24. The method of claim 23, wherein the second transmission time interval occurs earlier within the second semi-persistent scheduling pattern than the first transmission time interval occurs within the first semi-persistent scheduling pattern.

25. The method of claim 23, wherein the second transmission time interval occurs later within the second semi-persistent scheduling pattern than the first transmission time interval occurs within the first semi-persistent scheduling pattern.

26. The method of claim 17, wherein receiving the feedback message for the data transmission that comprises the indicator comprises:
receiving the feedback message for the data transmission that comprises the indicator that is a function of a remaining delay budget determined for a plurality of packet delay budget windows.

27. The method of claim 17, further comprising:
quantizing the remaining delay budget to determine a number of transmission time intervals, wherein the indicator indicates the number of transmission time intervals.

28. The method of claim 17, further comprising:
quantizing the remaining delay budget to determine a quantized time value, wherein the indicator indicates the quantized time value.

29. An apparatus for wireless communications by a user equipment (UE), comprising:
a processor,
memory coupled with the processor; and
instructions stored in the memory and executable by the processor to cause the apparatus to:

receive, from a network device, a data transmission that comprises an application packet; and transmit a feedback message for the data transmission that comprises an indicator of a remaining delay budget that is determined based at least in part on a processing time utilized for processing the application packet.

30. An apparatus for wireless communications by a network device, comprising:

a processor;

memory coupled with the processor; and instructions stored in the memory and executable by the processor to cause the apparatus to:

transmit, to a user equipment (UE), a data transmission that comprises an application packet; and receive a feedback message for the data transmission that comprises an indicator of a remaining delay budget that is determined based at least in part on a processing time utilized for processing the application packet.

* * * * *